United States Patent
Phillips et al.

(10) Patent No.: US 9,729,911 B2
(45) Date of Patent: Aug. 8, 2017

(54) RECORDING MULTICAST ADAPTIVE BITRATE (MABR) STREAMING CONTENT BASED ON SCHEDULE

(71) Applicant: Ericsson AB, Stockholm (SE)

(72) Inventors: Chris Phillips, Hartwell, GA (US); Jennifer Ann Reynolds, Duluth, GA (US)

(73) Assignee: ERICSSON AB, Stockholm (SE)

(*) Notice: Subject to any disclaimer, the term of this patent is extended or adjusted under 35 U.S.C. 154(b) by 0 days.

(21) Appl. No.: 14/963,871

(22) Filed: Dec. 9, 2015

(65) Prior Publication Data

US 2017/0171588 A1 Jun. 15, 2017

(51) Int. Cl.
| | |
|---|---|
| H04N 7/173 | (2011.01) |
| H04N 21/4147 | (2011.01) |
| H04N 21/262 | (2011.01) |
| H04N 21/6543 | (2011.01) |
| H04N 21/2662 | (2011.01) |
| H04N 21/242 | (2011.01) |
| H04N 21/239 | (2011.01) |
| H04N 21/4402 | (2011.01) |
| H04N 21/482 | (2011.01) |
| H04N 21/61 | (2011.01) |

(52) U.S. Cl.
CPC ..... *H04N 21/4147* (2013.01); *H04N 21/2393* (2013.01); *H04N 21/242* (2013.01); *H04N 21/2662* (2013.01); *H04N 21/26225* (2013.01); *H04N 21/440218* (2013.01); *H04N 21/482* (2013.01); *H04N 21/6125* (2013.01); *H04N 21/6543* (2013.01)

(58) Field of Classification Search
CPC .................................................. H04N 21/2662
See application file for complete search history.

(56) References Cited

U.S. PATENT DOCUMENTS

| | | | |
|---|---|---|---|
| 6,697,567 B1 | 2/2004 | Suzuki | |
| 2005/0238318 A1 | 10/2005 | Watanabe | |
| 2009/0144783 A1 | 6/2009 | Lee et al. | |
| 2010/0158101 A1* | 6/2010 | Wu | H04N 21/23424 375/240.01 |
| 2013/0312046 A1 | 11/2013 | Robertson et al. | |
| 2015/0163484 A1* | 6/2015 | Li | H04N 19/115 375/240.02 |
| 2015/0188963 A1 | 7/2015 | Bulava et al. | |
| 2015/0288617 A1 | 10/2015 | Dasher et al. | |

(Continued)

Primary Examiner — Olugbenga Idowu

(57) ABSTRACT

A system and method for facilitating recording of content in a multicast adaptive bitrate (MABR) streaming network using a DVR recording scheduler node. A program recording request may be generated at a subscriber device based on a program schedule to record a particular program, wherein the program recording request includes a priority level indicative of a video quality preference for recording the particular program. Optionally, the program recording request may also include an indication of a target recording device of the subscriber premises. The recording quality of the particular program may be dynamically adjusted based on bandwidth contention conditions on the subscriber premises bandwidth pipe and may involve disregarding the priority level indicated in the program recording request as long as there is no bandwidth contention.

10 Claims, 16 Drawing Sheets

(56) References Cited

U.S. PATENT DOCUMENTS

2015/0289003 A1 10/2015 Huber et al.
2015/0350704 A1* 12/2015 Horen ............... H04N 21/2393
                                                          725/95

* cited by examiner

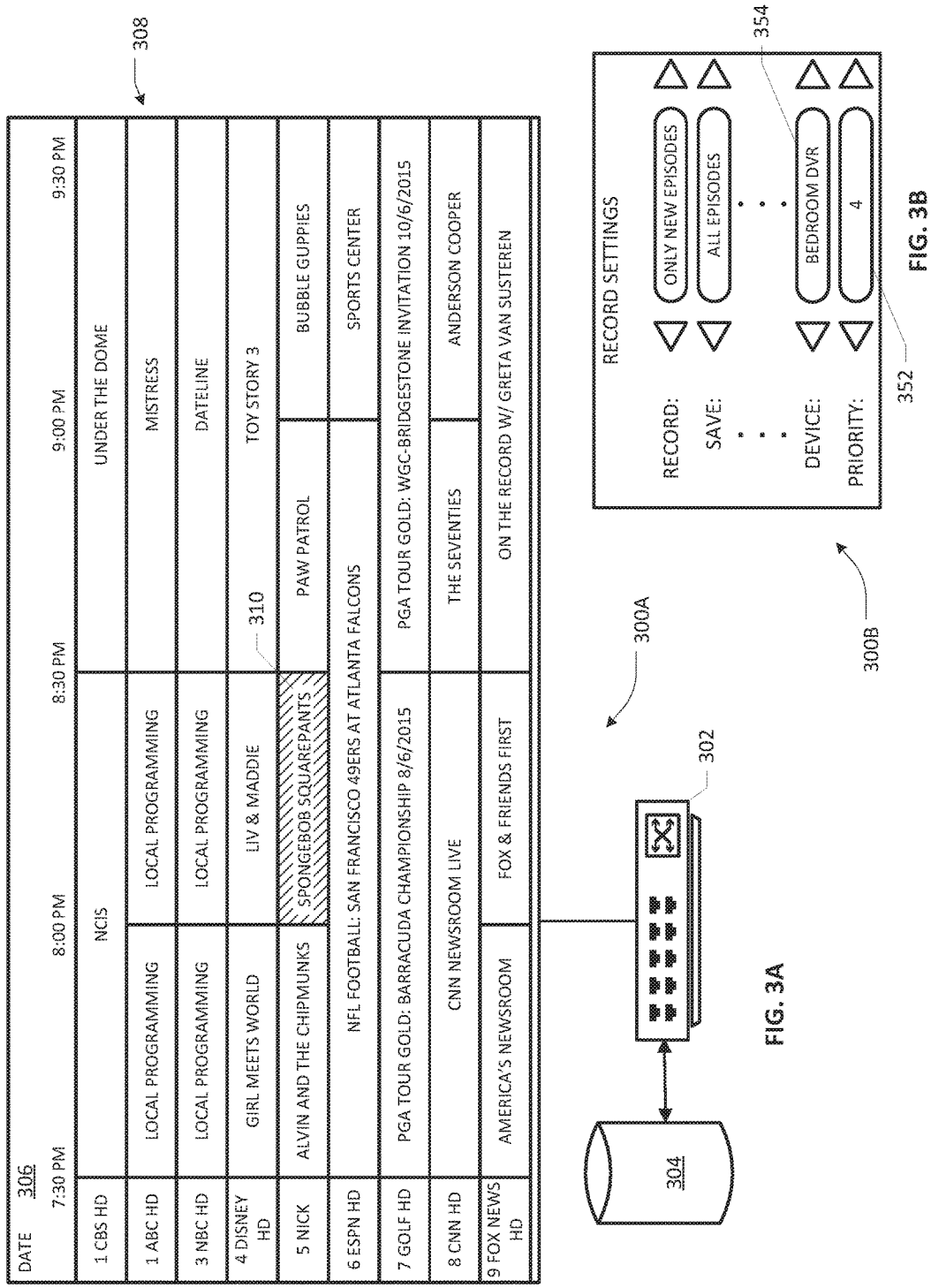

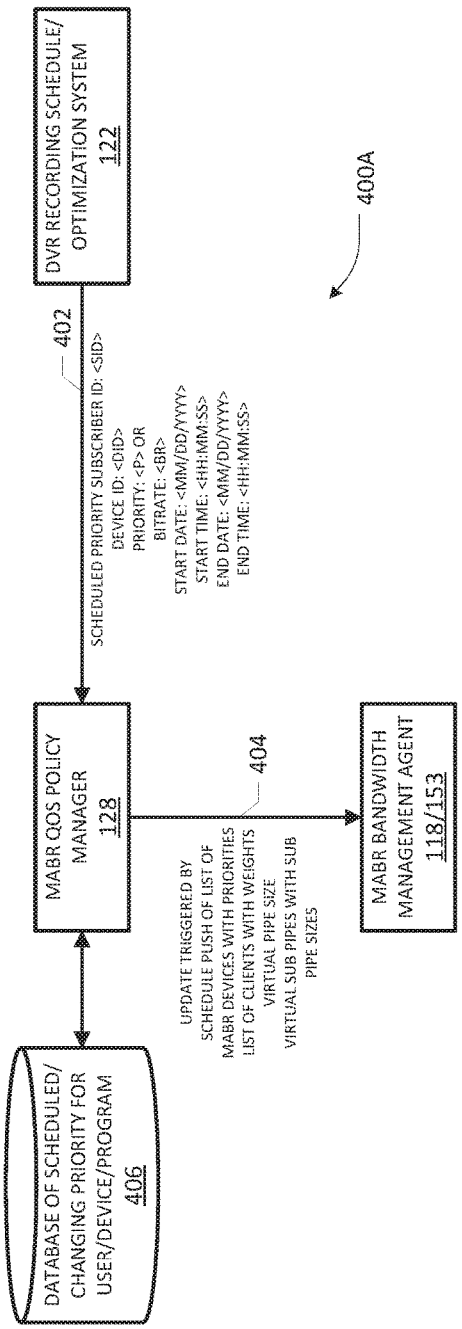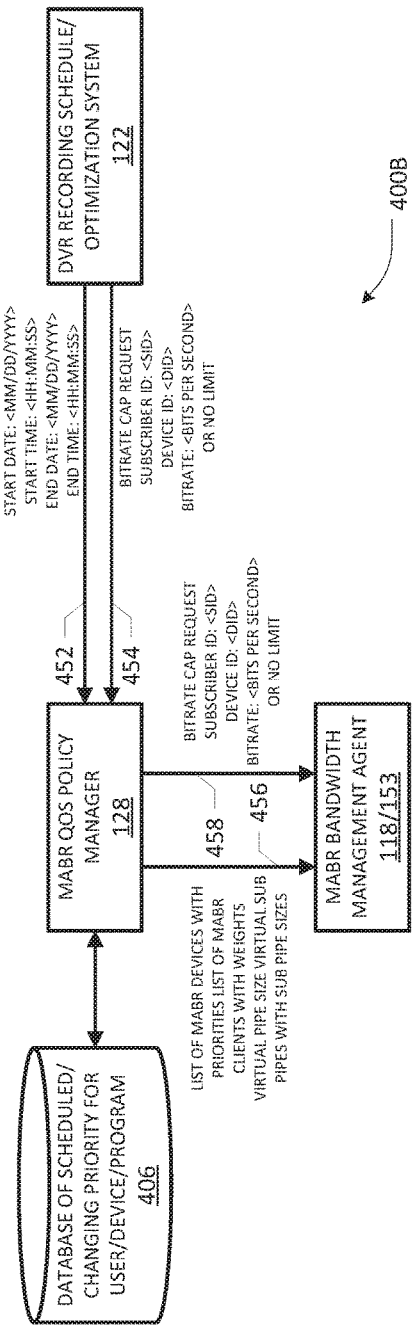

RECORDING MULTICAST ADAPTIVE BITRATE (MABR) STREAMING CONTENT BASED ON SCHEDULE

FIELD OF THE DISCLOSURE

The present disclosure generally relates to communication networks. More particularly, and not by way of any limitation, the present disclosure is directed to a system and method operative in a multicast adaptive bitrate (MABR) streaming network for recording MABR content based on a program schedule.

BACKGROUND

The near universal adoption of Internet protocol (IP) as a standard for digital transmission is revolutionizing the traditional way of video delivery. Typical applications such as IPTV and live video streaming have become increasingly popular over the Internet. To efficiently utilize the bandwidth resources of the network in these applications, the video is usually compressed with suitable media coding schemes and then delivered only to subscribers who request it. For data delivery, multicast is considered the most efficient paradigm for such applications, but the scalability issue of traditional IP multicast continues to hinder the deployment of a large-scale video delivery system with numerous channels.

Consumers are increasingly expecting flexible behavior from their video services, including live multicast ABR content offerings via IPTV platforms, to enhance available viewing options and features. However, traditional multicast environments are largely unsuitable for providing a rich user experience. For example, recording live multicast ABR content poses specific challenges compared to recording traditional single-bitrate content because bitrates can vary in a multicast and different devices in the same multicast group can consume different bandwidths.

SUMMARY

Embodiments of the present patent disclosure are broadly directed to systems, methods, apparatuses, devices, and associated non-transitory computer-readable media for facilitating recording of live content in an MABR communications network. In one aspect, a program recording request may be generated at a subscriber/client device based on a program schedule provided by a recording scheduler node to record a particular program, wherein the program recording request includes a user-selectable priority level indicative of, e.g., a metric or video quality preference for recording the particular program. Optionally, the program recording request may also include an indication of a target recording device of the subscriber premises. The recording quality of the particular program may be dynamically adjusted based on bandwidth contention conditions on the subscriber premises bandwidth pipe and may involve disregarding the priority level indicated in the program recording request as long as there is no bandwidth contention.

In another aspect, an embodiment of a method for recording content in an MABR communications network involves, inter alia, receiving a program recording request from a client device disposed in a subscriber premises including one or more client devices, the program recording request including a selection to record a particular program on a service channel provided as a plurality of MABR streams wherein each MABR stream corresponds to a particular bitrate representation of the service channel. The program recording request further includes, inter alia, a recording start time and date, a recording stop time and date, a priority level indicative of a metric, e.g., relative to a desired video quality for recording the particular program and, optionally, an indication of a target recording device of the subscriber premises on which recording of the particular program is to take place. At a time relevant to the recording start time and date, an update message may be generated to a multicast ABR video management agent (MVMA) that is operative to facilitate joining of a default recording device (or a specified target recording device) to a multicast ABR stream at a select bitrate representation of the particular program for recording. Preferably, the select bitrate representation for the multicast ABR channel is determined responsive to a bandwidth allocation for recording based on the priority level indicated in the program recording request. In one embodiment, the select bitrate representation of the particular program is allocated at least a portion of a subscriber premises bandwidth pipe servicing the subscriber premises responsive to bandwidth optimization across all service channels provided via the subscriber bandwidth pipe.

In another aspect, an embodiment of an apparatus for facilitating recording of content in an MABR communications network is disclosed. The claimed embodiment comprises, inter alia, a segmentation and gapping (SAG) unit configured to receive a plurality of encoded MABR streams for each service channel from an MABR encoder operative to receive a plurality of service channels or source feeds, wherein each encoded MABR stream corresponds to a particular bitrate representation of a specific service channel. The SAG unit is further operative to generate a segmented and gapped MABR stream for each encoded MABR stream of each service channel. A digital video recorder (DVR) scheduler is configured to provide program recording schedules to a client device disposed in a subscriber premises including one or more client devices, the program recording schedules comprising an electronic program guide showing a plurality of programs available on a set of MABR service channels serving the subscriber premises. The DVR scheduler element is further configured to receive a program recording request from the client device including a selection to record a particular program on a service channel. The program recording request further includes, inter alia, a recording start time and date, a recording stop time and date, a priority level indicative of a relative recording quality e.g., a metric or video quality preference, etc. relative to a desired video quality for recording the particular program and an optional indication of a target recording device of the subscriber premises on which recording of the particular program is to take place. A multicast ABR bandwidth policy manager is operably coupled to the DVR scheduler element and configured to generate, at a time relevant to the recording start time and date, a message to an MVMA element, operative to facilitate joining of a default recording device (or a specified target recording device) to a multicast ABR stream at a select bitrate representation of the particular program for recording responsive to bandwidth allocation based on the priority level indicated in the program recording request as set forth herein. In one variation, the MVMA element may be provided as a virtual machine running on a host platform disposed in the network. In another variation, the MVMA element may be co-located at a subscriber premises gateway node. In a still further variation, one or more components of the claimed apparatus may be provided in a distributed cloud-based architecture involving one or more layers of virtualized environments instantiated on commercial off the shelf (COTS) hardware.

In still further aspects, one or more embodiments of a non-transitory computer-readable medium containing computer-executable program instructions or code portions stored thereon are disclosed for performing one or more embodiments of the methods set forth herein when executed by a processor entity of a network node, premises gateway node, MABR bandwidth/QoS policy manager, DVR recording scheduler, or in a virtualized environment instantiated on a host machine. Additional features of the various embodiments are as claimed in the dependent claims.

Without limitation, advantages of one or more embodiments of the present invention are set forth in the context of the following. Benefits of the present invention include, but not limited to, the ability to prioritize recordings of various programs in an MABR network based on individual consumer preferences, both against other recordings as well as against channels consumed (i.e., watched) in real-time. Furthermore, it should be appreciated that in an MABR network, setting priority of a DVR at only the device level will result in that device always consuming the bandwidth based on its device level priority, which defeats individualizing users' viewing preferences. This can be undesirable when multiple people in a household are watching content at the same time and the DVR always consumes the same bandwidth across all recordings, because some members of the household may not care as much about quality (e.g., HD vs. SD) as other family members. Also, the same person in a household may want some content to be recorded at a higher quality than others when the bandwidth is constrained based on content, for example, sports vs. news. Embodiments herein advantageously overcome such issues by facilitating individualized recording options based on program content, whereby enriched viewing experiences may be achieved across various channels, multicast device groups as well as users. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 3A and 3B depict an example user interface of an electronic program guide or schedule launched at a subscriber device for facilitating a program recording request in an example an MABR communications network arrangement of FIG. 1A or FIG. 1B according to one embodiment;

FIGS. 4A and 4B are block diagrams involving network nodes or elements operative in an example MABR a network portion or subsystem that may be arranged as at least part of an apparatus for facilitating recording of content in an MABR communications network arrangement of FIG. 1A or FIG. 1B according to one embodiment;

DETAILED DESCRIPTION OF THE DRAWINGS

Figure 1A:
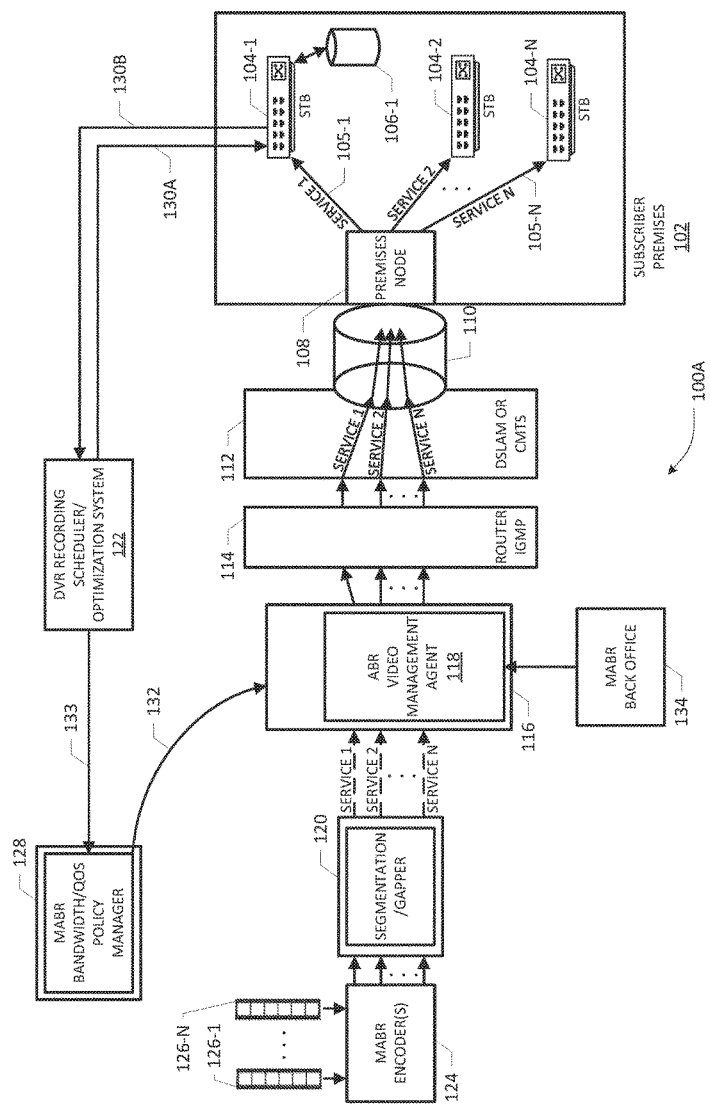
FIG. 1A depicts an example MABR communications network arrangement including a DVR recording scheduler wherein one or more embodiments of the present patent application may be practiced for recording program content at a recording device disposed in a subscriber premises.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., A/V media delivery policy management, session control and session resource management, Quality of Service (QoS) policy enforcement, bandwidth scheduling management, subscriber/device policy and profile management, content provider priority policy management, streaming policy management, and the like), in addition to providing support for multiple application services (e.g., data and multimedia applications). Example subscriber end stations or client devices may comprise devices configured to tune to multicast service channels that may comprise content delivered via a multicast ABR communications network as well as progressive download ABR clients, HTTP clients, and the like, for receiving content from one or more content providers, e.g., via a broadband access network. Broadly, such client devices may therefore include traditional or managed set-top boxes (STBs) with or without integrated cable cards, or with or without internal storage devices, connected/smart TVs, OTT STBs, standalone personal/digital video recorders (PVR/DVRs) or other mass media storage/recording devices, networked media projectors, portable laptops, netbooks, palm tops, tablets, phablets, smartphones, mobile/wireless user equipment, portable media players, portable gaming systems or consoles (such as the Wii®, Play Station 3®, etc.), and the like, which may access or consume content/services provided via a suitable delivery pipe provisioned for a subscriber premises (e.g., a home, office, or other facility), including program content channels (also referred to as service channels) delivered in a suitable MABR network architecture for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1A, depicted therein is an example MABR communications network environment 100A wherein one or more embodiments of the present patent application may be practiced for facilitating recording of MABR program content at a recording device disposed in a subscriber premises 102. In the context of the present disclosure, the MABR communications network environment 100A may implemented as an end-to-end network architecture for delivering MABR media content (and advertisement content, where applicable) using any delivery infrastructures, e.g., a Digital Subscriber Line (DSL) architecture, a Data Over Cable Service Interface Specification (DOCSIS)-compliant Cable Modem Termination System (CMTS) architecture, a suitable satellite access architecture or a broadband wireless access architecture. By way of example and introduction, MABR streaming delivery is broadly set forth herein that is applicable to both DSL and DOCSIS architectures without necessarily being limited thereto. As will be seen below, content may be delivered using either multicast ABR techniques or unicast ABR techniques. In a unicast delivery, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions are simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast delivery makes more efficient use of bandwidth by sharing content streams among several receivers, wherein the content may be provided with or without rate adaptation. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM) and Internet Group Multicast Protocol (IGMP). When a receiver requests a given media item, the network router system finds an existing stream of that content already in the network and directs a copy of it to that receiver from a serving cable headend, a video head office or an appropriately proximal network node in an edge distribution network. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts.

Subscriber premises 102, which is served by a suitable broadband pipe 110, is illustratively shown in FIG. 1A as having a plurality of client devices 104-1 to 104-N, some of which may consume multicast content and effectuate program recording requests in accordance with an embodiment of the present patent application, wherein one or more client devices may comprise STBs respectively coupled to or otherwise integrated with at least one display device (not specifically shown) and/or associated DVR/PVR or some other internal storage for recording programming content. For purposes for the present patent application, the terms "DVR", "PVR", or "mass media storage", or other terms of similar import may be somewhat interchangeably used, and may be broadly referred to as a target recording device, regardless of whether such recording device is integrated with a client device (e.g., STB) operative to launch a graphic user interface to display an Electronic Program Guide (EPG) for facilitating user selection of a program on a particular service channel for recording. Accordingly, the client devices 104-1 to 104N may include STBs, standalone DVRs, or other standalone recording/storage devices, provided as part of a premises network disposed in the subscriber premises 102. As the MABR program content may be encoded using different encoding schemes (i.e., source encoding), the client devices may be configured to operate with one or more coder-decoder (codec) functionalities based on known or hereto unknown standards or specifications including but not limited to, e.g., Moving Pictures Expert Group (MPEG) codecs (MPEG, MPEG-2, MPEG-4, etc.), H.264 codec, High Efficiency Video Coding or HEVC (H.265) codec, and the like, in order to receive and render various types of programming content that is delivered as a plurality of service channels. Further, in certain implementations, subscriber premises 102 may also include one or more progressive download clients such as, e.g., smartphones, computers, gaming devices or consoles, OTT STBs or tablets, etc., not specifically shown in FIG. 1A.

As noted, a premises network (not explicitly shown) may be disposed in the premises 102 for inter-operatively connecting the client devices 104-1 to 104-N to a suitable premises node or element 108 such as a DSL router/gateway or a cable modem that is operative to effectuate communications (including bearer and signaling traffic) with respect to the client devices of the premises. Regardless of the exact composition of the client devices, including any standalone recording devices, such a premises network, which may be implemented using any suitable wireless or wireline network technologies, may therefore comprise network paths or pipes 105-1 to 105-N for streaming service channel content to respective client devices, including the program content selected for recording, whose bandwidth allocations may be modulated or managed in accordance with the teachings herein. Although not specifically shown in FIG. 1A, it should be appreciated that premises 102 may also include other devices that may consume bandwidth for other data and voice communications as previously noted. Accordingly, the total bandwidth of subscriber premises pipe 110 may be apportioned between or allocated to a virtual video pipe for streaming of managed service channels, a shared video pipe portion for servicing progressive download clients if present (i.e., progressive ABR download pipe), in addition to data and voice pipes. Furthermore, as will be set forth in detail further below, a portion of the managed video pipe may be dynamically allocated to program content selected for recording according to certain embodiments of the present invention.

In an example implementation, subscriber premises 102 may be served via an access network architected over DSL infrastructure or DOCSIS-compliant CMTS infrastructure. Accordingly, the subscriber premises bandwidth pipe 110 may be disposed between subscriber premises node 108 and an access node 112 such as a DSL Access Multiplexer (DSLAM) node or a CMTS node. A suitable IGMP switch or router 114 (e.g., IGMPv2/v3-capable Gigabit Ethernet (GigE) multicast router) is coupled to the access node 112 for effectuating suitable IGMP Leave/Join messages, in conjunction with additional functionalities or structures set forth in detail further below, with respect to joining, leaving or changing various multicast streams, including program channels selected for recording, corresponding to the service channels available to client devices 104-1 to 104-N of the subscriber premises 102.

One or more ABR encoders 124, which may be provided as part of a multicast stream formation (MSF) functionality in one example embodiment, are operative to receive a plurality of channel source feeds 126-1 to 126-N corresponding to a group of service channels that may be provided as MABR channels having segmented streams at different bitrate representations as will be described in detail below. Typically, the ABR encoder 124 receives live feeds from appropriate communications networks, although it is possible in an alternative or additional arrangement for a file-based streamer to read the content files from a disk and stream the content streams via a network to the ABR encoder 124. Accordingly, the channel source feeds may comprise a variety of content or programs, e.g., pay TV broadcast programs delivered via cable networks or satellite networks, free-to-air satellite TV shows, IPTV programs, time-shifted TV (TSTV) content, and the like. Regardless of how channel source feeds are generated and provided to the ABR encoder 124, a segmentation and gapping (SAG) unit 120 is configured to receive a plurality of encoded MABR streams for each service channel from the MABR encoder 124. As noted, each encoded MABR stream corresponds to a particular bitrate representation (e.g., 10 Mbs to 500 Kbs that correspond to various levels of video quality or resolutions) of a specific service channel to which a subscriber station may tune for watching or a channel on which a particular program has been selected for recording. SAG element 120 is operative to generate a segmented and gapped MABR stream for each encoded MABR stream of each service channel in a gapping functionality that may also be provided as part of an MSF module or node described in further detail below.

In accordance with the teachings of the present invention, a DVR recording scheduling optimization node, subsystem or element 122 is disposed in the MABR communications network environment 100A that is operative to interface with one or more client devices of the premises 102 in order to facilitate priority-based recording settings at a client device. In one implementation, the DVR recording scheduler node 122 may be configured to provide one or more program recording schedules to a client device, e.g., device 104-1, via a suitable path 130A, wherein the program recording schedules may comprise information for an Electronic Program Guide (EPG) that is displayable on a display device associated with the client device 104-1. By way of illustration, an example EPG may be provided as or via an interactive graphical user interface that shows a plurality of programs available on a set of MABR service channels serving the subscriber premises, including program start times and dates, program ending times, as well as other indicia related to the programs. Furthermore, as will be described in further detail below, the DVR scheduler element 122 is further configured to receive a program recording request from the client device 104-1 via a suitable path 130B, wherein the program recording request includes a selection to record a particular program on a service channel. In addition, the program recording request further includes a recording start time and date, a recording stop time and date, a priority level, e.g., indicative of a relative recording quality at which the particular program is to be recorded (i.e., a relative indication of desired recording quality for recording that particular program). In a further embodiment, the program recording request from the client device may also include an indication of a target recording device of the subscriber premises on which recording of the particular program is to take place. For example, the recording may take place at the scheduled time on a DVR integrated or otherwise associated with the client device from which the program recording request is generated, or on a standalone mass media storage device of the premised network, or on a DVR integrated or otherwise associated with another client device. By way of illustration, whereas reference numeral 106-1 refers to a storage or DVR device associated with the client device 104-1, additional DVRs as well as one or more standalone premises network storage devices may also be provided as part of the subscriber premises 102 in FIG. 1A. In one example implementation, an illustrative program recording request or associated message from the client device 104-1 may therefore take on a form shown below:

Scheduled Priority Change:
        Subscriber ID: <sid>
            Device ID: <did>
                Priority: <p>
    Channel ID: <channel id>
    Start Date: <mm/dd/yyyy>
        Start Time: <hh:mm:ss>
            End Date: <mm/dd/yyyy>
            End Time: <hh:mm:ss>

In accordance with further teachings of the present invention, a multicast ABR bandwidth and QoS policy manager node, element or subsystem 128 is operably coupled to the DVR scheduler element 122 for receiving the scheduled recording priority level information therefrom via a suitable path 133 and, responsive thereto, the MABR bandwidth/QoS policy manager 128 is configured to provide bandwidth allocation policy information to a multicast ABR video management agent (MVMA) node, element or subsystem 118 for effectuating channel joining, channel changing and recording of the selected program content at suitable bitrate streams or representations as will be set forth hereinbelow.

In one implementation, the multicast ABR bandwidth policy manager 128 may be configured to generate a message to the MABR video management agent (MVMA) 118 with suitable information, e.g., as a push-based message at a scheduled triggering events, that includes but not limited to device-based bandwidth allocations, program-based bandwidth allocations, pipe management policies, recording bandwidth allocations, etc. Such messages may be triggered based on program recording requests emanating from the subscriber/client devices in the MABR network environment, for instance, and may be provided via a suitable path 132 to MVMA 118. In addition, a MABR back office node or element 134 is coupled to MVMA 118 for providing information regarding all multicast services as well as corresponding MABR bitrates for each service supported in the network 100A. According to the teachings of the present invention, MVMA 118 is operative responsive to the bandwidth allocation/update messages from the multicast ABR bandwidth policy manager 128 for joining of various service channels being provided to the subscriber premises, including program streams selected for recording on one or more target recording devices at appropriate bitrate representations of the service channels based on channel packing techniques applied to the subscriber premises bandwidth pipe. As part of channel joining operations, MVMA 118 may therefore be configured to receive the segmented and gapped MABR streams for each service channel from SAG 120, join and de-gap the MABR streams at select bitrate representations for transmission downstream to the premises 102 via IGMP router 114 and DSLAM/CMTS 112.

Depending on implementation, one arrangement may involve providing the MVMA functionality at a location upstream from IGMP router 114. Further, in such an arrangement (also referred to as "network agent implementation"), the MVMA functionality may be provided as a virtual machine function (i.e., in a virtualized environment running on a physical/hardware platform) instantiated at a network node or element. In an alternative arrangement, the MVMA functionality may be provided at the premises gateway (also referred to as "gateway agent implementation"). In a still further arrangement, the MVMA functionality may be provided in a cloud or at a CDN edge node. Regardless of where it is implemented, the MVMA functionality has the overall responsibility for joining multicast service channels, including channels whose programs have been selected for recording, at appropriate timing reference points, and having suitable bitrate representations in order to effectuate subscriber pipe bandwidth management in an optimal manner.

One skilled in the art will recognize that a network agent implementation is illustrated in FIG. 1A, wherein a service node 116 having the MVMA functionality 118 is disposed north of IGMP router 114 (i.e., toward the network core). Accordingly, in this implementation, de-gapped multicast streams for the service channels at select bitrates are passed through the IGMP router 114, access node 112, and ultimately to the client devices via the premises node 108. In the arrangement shown in FIG. 1B, an example MABR communications network environment 100B is illustrative of a gateway agent implementation, wherein a premises node 152 includes appropriate MVMA service logic or module 153 for performing the de-gapping and joining operations. This architecture allows for de-gapping multicast streams at the last possible moment, but requires segmented and gapped MABR streams in select multiple bitrate representations to be traversed through IGMP router 114 and access node 112, all the way to the premises node 152.

Figure 13:
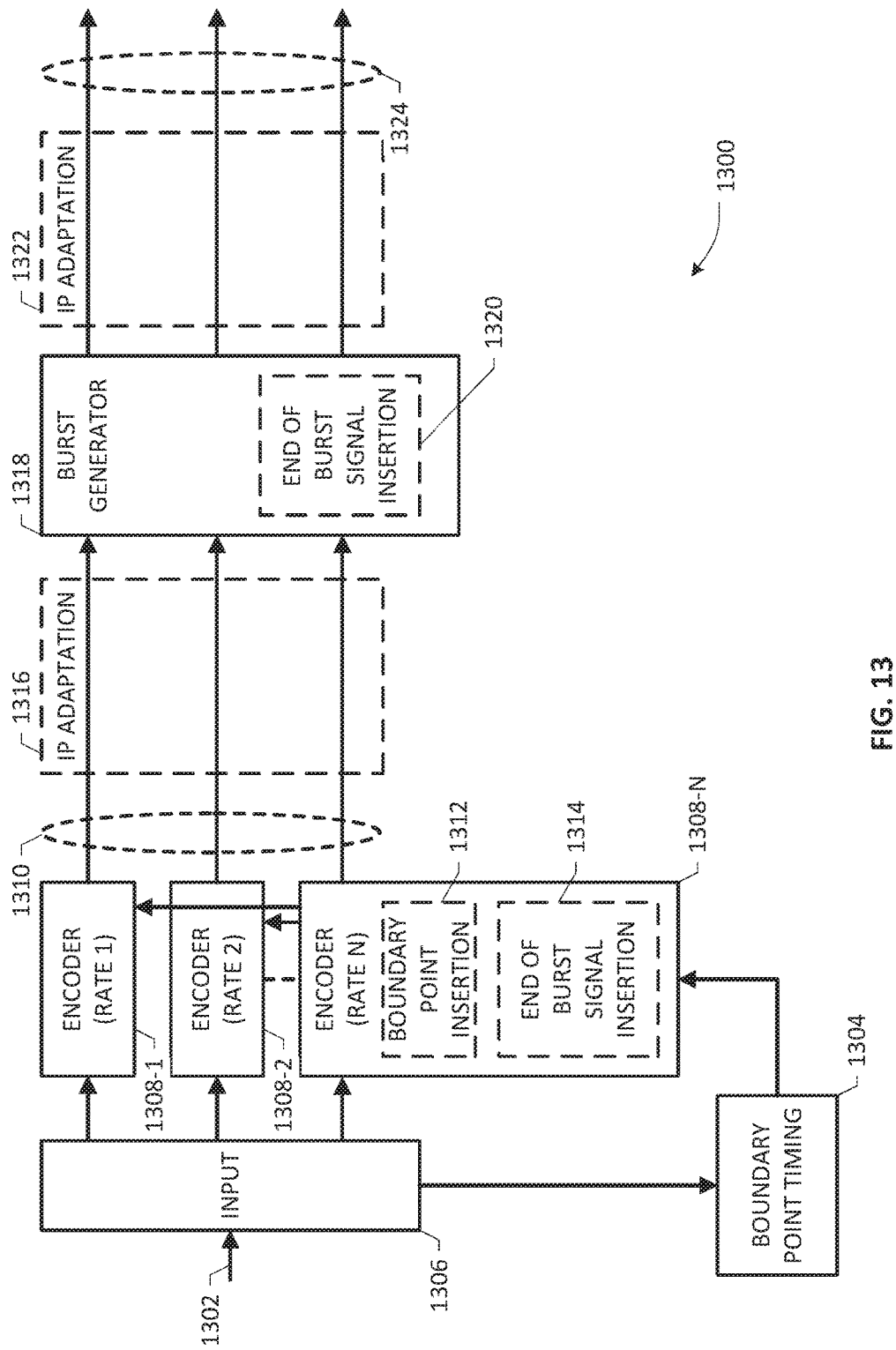
FIG. 13 depicts a block diagram of an apparatus for segmenting media/content channels according to an embodiment of the present patent application.

Regardless of where an example MVMA node is implemented, it is required to receive segmented/gapped MABR streams corresponding to the multicast service channels from SAG functionality 120. Furthermore, SAG functionality 120 and encoder functionality 124 may be combined into an MSF functionality as noted above. Attention is now directed to FIG. 13 that depicts a block diagram of an apparatus 1300 operative as a multicast ABR encoder and gapper for segmenting or packaging content channels according to an embodiment of the present patent application. Apparatus 1300 is advantageously configured for creating a set of segmented stream representations and forming bursts with respect to a media service, which segmented streams may be provided with suitable inter-segment gaps that allow channel operations such as channel joining, channel leaving, switching, splicing in or splicing out, channel (re)multiplexing, de-gapping, etc. as part of downstream operations (e.g., at MVMA functionality 118, IGMP switch 114, and/or MVMA functionality 153). In an example implementation, apparatus 1300 may receive an input feed 1302 of content per service (e.g., corresponding to any of channel source feeds 126-1 to 126-N in FIG. 1A or FIG. 1B) at an input block 1306 that fans the feed to a plurality of encoders/transcoders 1308-1 to 1308-N, which generate, in parallel, a set of representations of the content at different bitrates. The representations can differ in video resolution depending on the bitrate of encoding. A timing generator 1304 outputs a signal that determines the boundary point of the segments. For example, this functionality may output a signal once per 50 frames (2 seconds), or at any other suitable time interval. The signal output by generator 1304 is applied to all of the parallel encoders 1308-1 to 1308-N for that service. Advantageously, the set of coders 1308-1 to 1308-N can close a Group of Pictures (GOP) and a boundary point insertion unit 1312 can insert in-band signaling such as a Random Access Point (RAP) and a Boundary Point (BP). The outputs of the set of coders 1308-1 to 1308-N are the set of representations 1310 which have time-aligned and/or frame-aligned segments. The representations 1310 are applied to a burst generator unit 1318 that creates the bursts separated by window periods (e.g., on the order of tens or hundreds of milliseconds). In operation, unit 1318 may be configured to play out data at a higher bit rate than the bit rate at which data was received to create the bursts and is operative to recognize the start and end of segments in the representations 1310 by detecting suitable signaling markers (e.g. the in-band BP signaling inserted by the encoders).

Multicast address information may be added at an IP adaptation stage, which can occur at a network node hosting the MVMA functionality or at a node further downstream. Multicast IP datagrams have a destination IP address that is set to be in a range reserved for multicast. In FIG. 13, reference numeral 1324 refers to a bundle of IP-addressed streams generated by the apparatus 1300. It should be appreciated that the apparatus shown in FIG. 13 can operate on data at one of various possible levels. In one advantageous scheme, data may be encoded into Transport Stream (TS) packets at a normal rate and the burst generator unit 1318 operates on TS packets. Transport Stream packets can be adapted into IP packets before burst generator unit 1318 at adaptation block 1316, or after unit 1318 at adaptation block 1322. Another alternative is to form bursts before any packetization (at TS or IP level), but this may be less desirable.

FIG. 13 further illustrates several possible places where end of burst signaling can be added. Each encoder 1308-1 to 1308-N can include an end of burst signal insertion unit 1314 that adds an information element indicating the end of a burst into the encoded data, which includes a header of the TS packets. Alternatively, the burst generator unit 1318 can include an end of burst signal insertion unit 1320 arranged to insert an information element indicating the end of a burst into each of the bursts. Where end of burst signaling is provided as a multicast (with same or different address), the multicast can be generated at the edge network node.

Figure 1B:
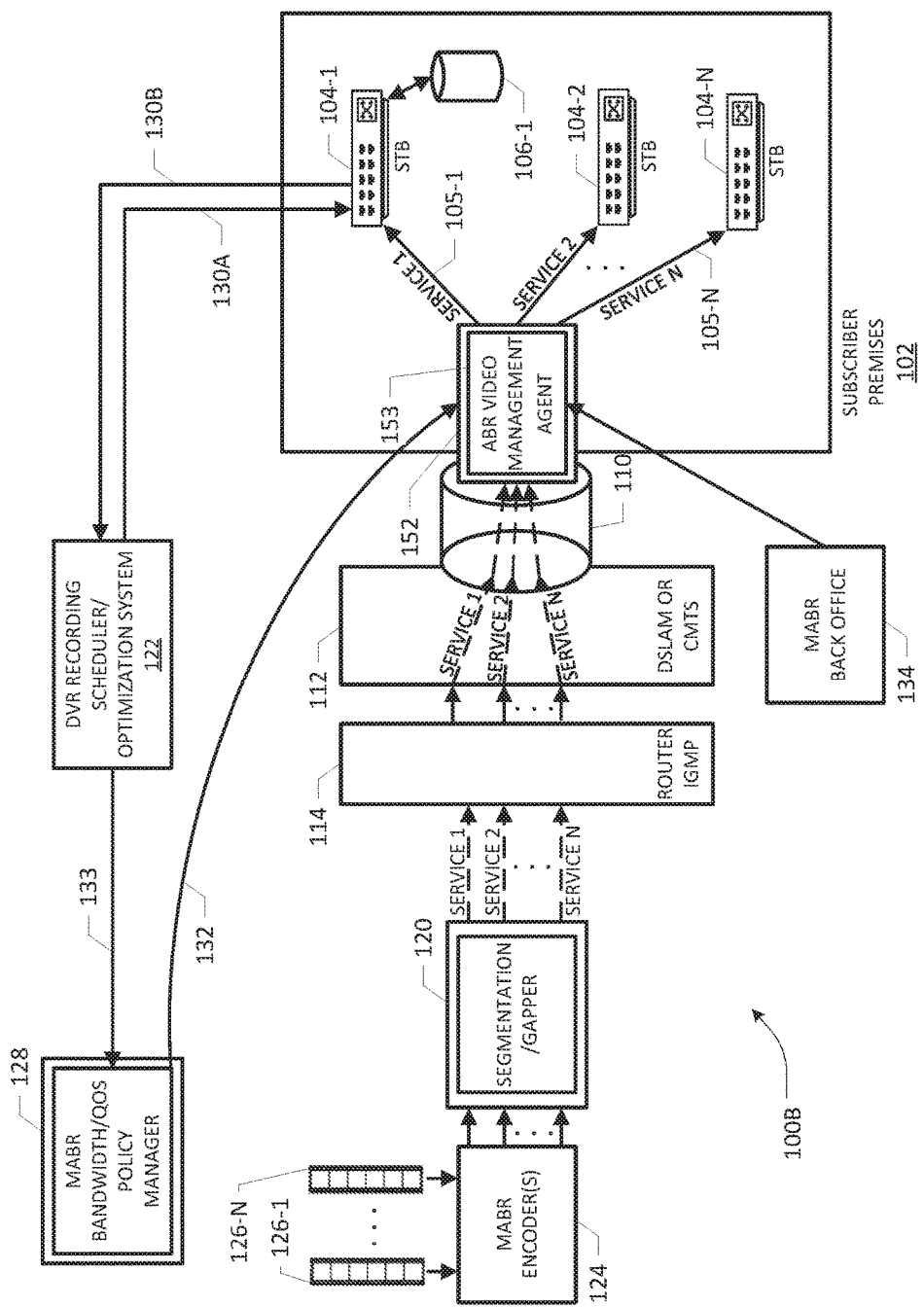
FIG. 1B depicts another example MABR communications network arrangement including a DVR recording scheduler wherein one or more embodiments of the present patent application may be practiced for recording program content at a recording device disposed in a subscriber premises.

Typically, a network operator may receive a media content service feed from a service provider, which may then be converted to streams or channels having the right characteristics for the edge distribution network and end users of the network. Although FIG. 13 shows a set of encoders/transcoders 1308-1 to 1308-N configured to operate upon an input data stream 1302 to form the multiple representations at different bitrates, such a stage may be bypassed where a set of representations at different bitrates already exist (e.g., by way of a separate encoder 124 as shown in FIGS. 1A and 1B). Accordingly, it should be understood that multiple representations for a media content service channel can be generated at a point of origin into the MABR communications network or could be supplied by a service provider, wherein the multiple representations can include various quality definitions, e.g., Standard Definition (SD), High Definition (HD), Ultra HD, etc., of the same content. A skilled artisan will recognize that the duration of the window period (e.g., 200 to 300 milliseconds or thereabouts) introduced in a segmented stream is of sufficient magnitude for a multicast receiver to leave one representation of the stream and join a different representation at a different bitrate or an entirely different media stream, at appropriate timing reference points, e.g., stream access points (SAPs), which may be accomplished by issuing appropriate IGMP Leave and Join messages.

A potential consequence of adding window periods or gaps to the transmitted streams is that the flow of content may become jittered beyond the level that normal packet transmission produces. This can be accommodated by buffering provided within an intermediary reception apparatus, e.g., MVMA functionality 118. The window period duration will influence the amount of jitter produced and so there is an optimum size that is related to the worst-case response times of the chain of routers/servers delivering the content. This time is taken for switches to recognize and implement all those steps that are required to keep the stream flowing, including the potential need for the multicast content to be found at or near the source server. For segment durations of the order of about 2 seconds, a possible value of the window period is around 330 milliseconds. The window size is a function of the responsiveness of the network to support multicast Leave and Join functions and it will be appreciated that the window period can be modified to a higher or lower value. More generally, the window period could have a value selected from the range of 0.1 ms and 10 seconds and, more advantageously, the range 10 ms-350 ms. As switches and routers increase in performance, it is possible that the window duration can be reduced to the lower end of the ranges stated above. In one implementation of the MVMA functionality, a 300 ms gap and suitable buffering may allow MVMA 118 (or MVMA 153 in a gateway agent implementation) to perform IGMP Leave and Join operations for seamless switching of regular multicast service channel content with respect to channel tuning/change requests as well as tuning to appropriate service channels at scheduled recording times as per requests from client devices. Whereas the segmented/gapped MABR streams for various service channels are received at receive ports of the MVMA node with multicast addresses changing on the fly, the downstream port addresses are fixed, corresponding the various service channels, to which IGMP Join operations are ultimately propagated from the subscriber stations. Additional details regarding multicast segmented stream formation and channel joining/leaving techniques may be found in commonly owned PCT Application No. PCT/EP2012/070960, titled "A METHOD AND APPARATUS FOR DISTRIBUTING A MEDIA CONTENT SERVICE", filed Oct. 23, 2012, in the name(s) of Anthony Richard Jones, now published as WO2014/063726, incorporated by reference herein.

Figure 2:
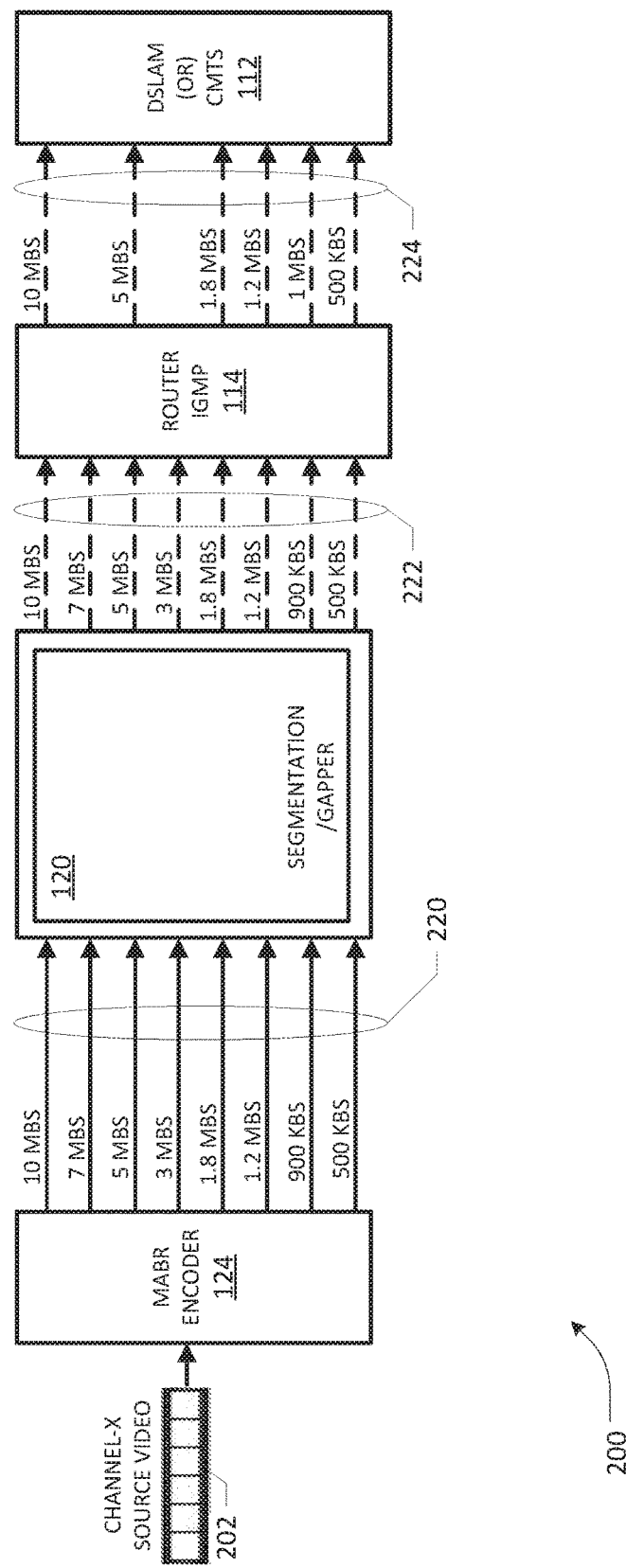
FIG. 2 depicts a network portion or subsystem that may be arranged as at least part of an apparatus for facilitating recording of content in an MABR communications network arrangement of FIG. 1A or FIG. 1B according to one embodiment.

FIG. 2 depicts a network portion or subsystem 200 that may be arranged as at least part of an apparatus for facilitating recording of content in an MABR communications network arrangement of FIG. 1A or FIG. 1B according to one embodiment. In particular, subsystem 200 shows further details of an example implementation of SAG functionality 120 that is operative to generate a set of gapped streams (e.g., having ~300 ms gaps between SAPs of two segments (i.e., inter-SAP gap)) with respect to a particular service channel feed 202 that may be tuned to for recording, real-time watching, or both, by a user operating a client device of the subscriber premises 102, wherein the channel feed 202 is illustrative of the service channels 126-1 to 126-N shown in FIGS. 1A and 1B. Consistent with the description above, the channel feed 202 may be received by MABR encoder/transcoder 124 for generating a plurality of encoded (and unsegmented) streams encoded at, e.g., 10 Mbs to 500 Kbs (i.e., multiple bitrate representations) as exemplified by reference numeral 220, which may be processed as corresponding segmented streams 222 by the segmenter/packager 120.

In one embodiment, SAG 120 may be configured to transmit all possible bitrates for services that are identified as multicast services to the next element downstream as per the standard multicast operations. Where the MVMA functionality is embodied in a network agent implementation, it is typically the downstream recipient of the regular multicast gapped/segmented streams 222 with respect to each service channel. In a gateway agent implementation, such streams are provided to the IGMP router 114, as shown in the illustrative arrangement of FIG. 2, wherein the IGMP router 114 may pass along streams for only those channels that are active, as shown by example downstream bundle 224 propagating towards DSLAM/CMTS node 112 (and ultimately to the premises gateway node's MVMA functionality, which joins the client device to the de-gapped stream having the right bitrate representation). As will be described below, the MVMA functionality is modulated based on, inter alia, messages provided by MABR bandwidth/QoS policy manager 128 responsive to the information received from the DVR scheduler optimization subsystem 122.

FIG. 3A depicts an example user interface associated with an EPG or schedule 300A launched at a client device 302 for facilitating a program recording request in an example an MABR communications network arrangement of FIG. 1A or FIG. 1B according to one embodiment. It should be appreciated that EPG 300A may be launched by operating a traditional remote control device suitably modified in accordance with practicing an embodiment of the present invention. In another implementation, an EPG interface may be provided or generated using other types of client devices as well, e.g., laptops, tablets, smartphones, etc., which may be provided with suitable "apps" for launching multicast IPTV/video services. Regardless of the specific implementation, EPG interface 300A may include programming information for various channels 304, including timing information 306, program titles 308, etc., that may be provided in a scrollable grid. In one configuration, when a user selects a particular program 310 for recording, a pull-down menu or dialog box 300B may be provided as an overlay menu window or as a separate interface for presenting and/or setting a plurality of options relative to recording the selected program. Among the available options, a priority option 352 is operative for setting or selecting a specific priority level that is indicative, illustrative or otherwise representative of a video quality preference (e.g., relative to SD, HD, UHD, etc.) for recording the particular program. Another option 354, which may be referred to as a recording device option, is operative for setting or selecting a target recording device of the subscriber premises on which the particular program is to be recorded. It will be apparent to one skilled in the art that such options may be configured in numerous ways, e.g., with drop-down submenus, dialog boxes, clickable icons, and the like. Furthermore, where Digital Rights Management (DRM) constraints or other restrictions with respect to the program may be implemented, appropriate paywall portals etc. may be presented at any level of the interface 300A and/or recording settings menu 300B.

In one configuration, a default target recording device may be provided, which may comprise an DVR or other storage associated or otherwise integrated with the client device 302, wherein the default setting may be over-writable or reconfigurable. In another configuration, a networked storage may be provided as the target recording device, either in a default setting or otherwise. Reference numeral 304 in FIG. 3A refers to a recording device that is broadly illustrative of all such target recording device variations and configurations operative for practicing an embodiment of the present invention.

FIGS. 4A and 4B are block diagrams involving network nodes or elements operative in an example MABR a network portion or subsystem that may be arranged as at least part of an apparatus 400A/400B for facilitating recording of content in an MABR communications network arrangement of FIG. 1A or FIG. 1B according to an embodiment. In one implementation, apparatus 400A or 400B depicts a network portion involving MABR bandwidth/QoS policy manager node 128, MVMA 118/153 and DVR recording scheduler/ optimization node 122 described hereinabove, with example message flows shown therein that may be implemented in one or more arrangements. In one arrangement, DVR recording scheduler/optimization node 122 receives one or more program recording requests including respective recording priority level indicators from one or more client devices and provides that information via a message flow 402 to MABR bandwidth/QoS policy manager 128, which uses that information in maintaining suitable databases 406 associated therewith. At appropriate times relevant or relative to recording times, MABR bandwidth/QoS policy manager 128 generates messages to MVMA 18/153 via a message flow 404, which include QoS/device bandwidth management information, recording bandwidth management information and pipe management policy information. In another arrangement directed to achieve recording space optimization, additional information (e.g., including a bitrate cap may be provided to MVMA 118/153, as shown in FIG. 4B, which depicts message flows 452, 456 similar to the flows 402 and 404 of FIG. 4A in addition to bitrate-based message flows 454, 458. Additional details regarding DVR space optimization techniques, which may be practiced in combination with one or more embodiments set forth in the present patent application, may be found in the following commonly owned U.S. patent application entitled: "RECORDING DEVICE SPACE OPTIMIZATION IN A MULTICAST ADAPTIVE BITRATE (MABR) STREAMING NETWORK", (Ericsson Ref. No.: P47859-US1), application Ser. No. 14/963,919 filed even date herewith, in the name(s) of Christopher Phillips et al., incorporated by reference herein.

In one embodiment of the invention, therefore, various modules of the apparatus 400A/400B may use information obtained from the client device and the MABR bitrates available (e.g., from the MABR back office) to choose a maximum (capped) bitrate for a recording based on the additional information comprising when the recording is scheduled, how much storage space is available for the recording and the priority of the program selected for recording. Since the service logic executing on the apparatus 400A/400B has access to all future recordings (e.g., at MABR database 406), it can make complex decisions based on future database usage. It should be noted that while some pieces of the information may mostly be passed through to MVMA 118/153, database 406 may be configured to save various scheduled/changing priorities, which allows MABR bandwidth/QoS policy manager 128 to keep track of changing priorities depending on user selections, reversion to default priority level settings, etc. In a still further arrangement, both recording priority levels as well as device-based priorities or weights may be used in bandwidth allocation techniques in order to manage the subscriber pipe's bandwidth via suitable IGMP Join/Leave operations. For example, in one implementation, a given DVR's priority may be varied based on what it is recording and, therefore, different bitrate representations of a program or programs may be joined to the DVR responsive to different priority levels. In other words, a client device's priority may be overridden based on the program content selected for recording.

Figure 5:
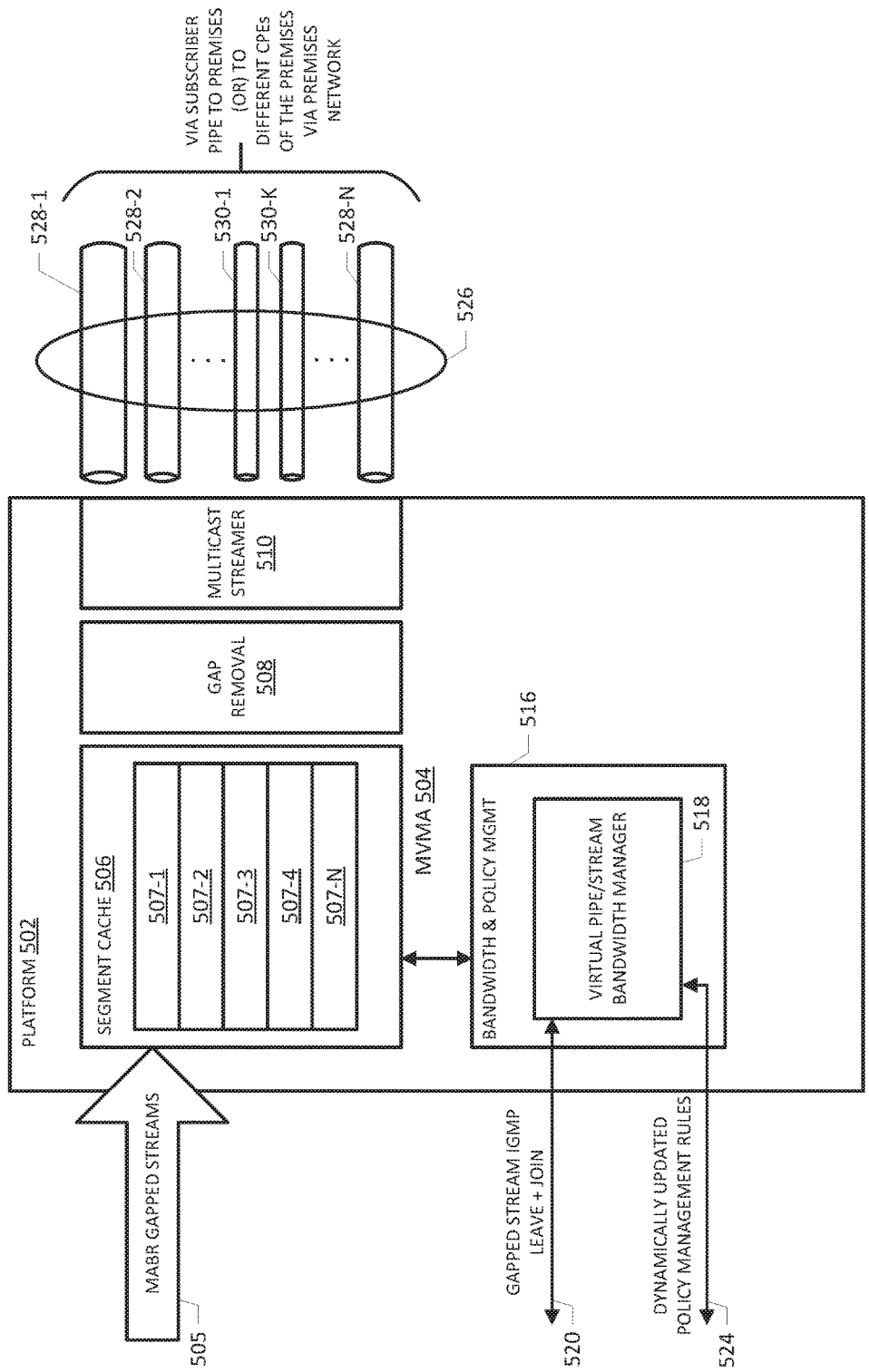
FIG. 5 is a block diagram of a video management agent operative in an example MABR communications network arrangement of FIG. 1A or FIG. 1B according to one embodiment.

FIG. 5 is a block diagram of a node, element, apparatus or subsystem 500 operative in an example an MABR communications network arrangement of FIG. 1A or FIG. 1B according to one embodiment, wherein an MABR video management agent or functionality 504 may be realized as a virtual function or virtual machine on a host hardware/software platform 502, e.g., in a network agent implementation, or in a premises gateway agent implementation. As described previously, a plurality of MABR gapped/segmented streams 505 comprising various bitrate representations of multicast service channels may be received by node 502 at corresponding multicast IP addresses, which may be changing on the fly depending on the IGMP Join/Leave operations. A segment cache 506 is provided wherein a plurality of segments corresponding to one or more active multicast service channels having potentially different bitrate qualities, e.g., as referenced by reference numerals 507-1 to 507-N, may be stored. A gap removal module 508 is operative in conjunction with a multicast streamer 510 to de-dap the gapped segments of a multicast service channel stream, and remux and multicast the service channel stream towards the premises gateway and ultimately to the client devices disposed therein on ports having suitably fixed multicast IP addresses that the receiving entities are aware of. A virtual pipe or stream bandwidth manager 518 that may be part of an overall bandwidth and policy management module 516 is operative in conjunction with the segment cache 506 to manage a subscriber premises bandwidth pipe or pipe portion allocated for multicast IPTV/video services. The virtual pipe and stream bandwidth manager 518 is also operative to effectuate channel/stream joining and leaving operations with respect to suitable bitrate representations of gapped service channel streams under IGMP Join and Leave operations 520 as well as dynamically updated policy management rules 524, including recording bandwidth management rules, which may be received as message flows 404, 456, 458, or a sub-combination thereof, from MABR bandwidth/QoS policy manager 128. By way of illustration, reference numerals 528-1 to 528-N refer to a plurality of bandwidth pipes for streams being provided to a subscriber premises for watching whereas reference numerals 530-1 to 530-K refer to a plurality of bandwidth pipes for streams being provided to one or more recording devices of the subscriber premises via a pipe 526.

One skilled in the art will recognize upon reference hereto that regardless of where an MVMA node is implemented (e.g., the network agent implementation of FIG. 1A or the gateway agent implementation of FIG. 1B), the overall functionality of apparatus 400A/400B in conjunction with MVMA functionality for joining an MABR stream having suitable bitrate representation for recording in an example MABR communications environment is broadly the same. Accordingly, various details concerning the foregoing general operations will be described below in an agnostic manner taking reference to the remaining drawing Figures, wherein the description is equally applicable to both network/VM agent and gateway agent implementations, mutatis mutandis.

Figure 6A:
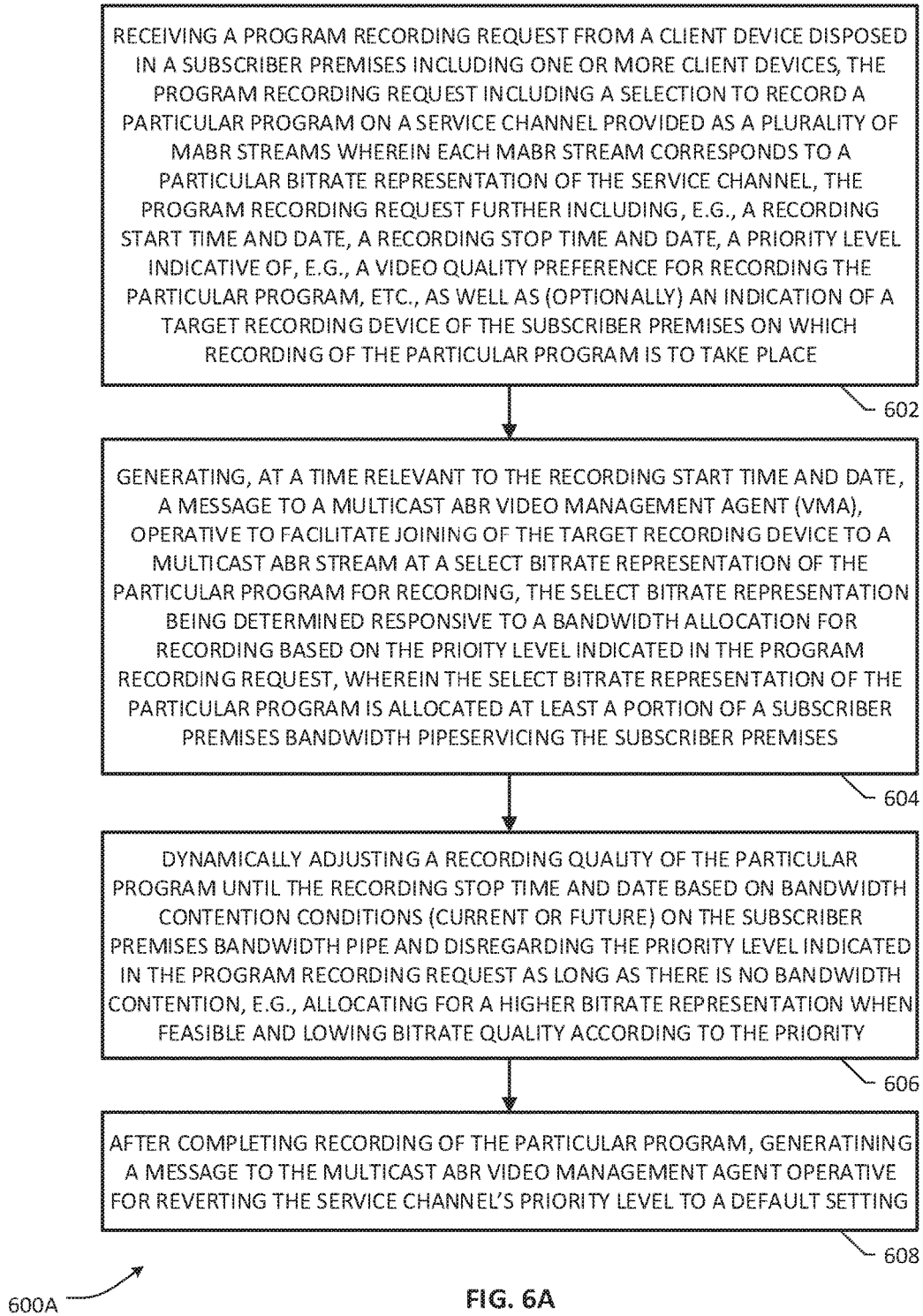
FIG. 6A depicts a flowchart of an example process for recording content in an MABR network according to one embodiment.

FIG. 6A depicts a flowchart of an example process 600A for recording content in an MABR network according to one embodiment. At block 602, a program recording request from a client device (e.g., an STB) disposed in a subscriber premises including one or more client devices is received, wherein the program recording request includes a selection to record a particular program on a service channel. As noted previously, such a service channel may be multicast as a plurality of MABR streams, each MABR stream corresponding to a particular bitrate representation of the service channel based on the functionality of the network portions described in detail hereinabove. The program recording request further includes additional pieces of information, e.g., a recording start time and date, a recording stop time and date, a priority level indicative of, e.g., a video quality for recording the program, etc., as well as (optionally) an indication of a target recording device of the subscriber premises on which recording of the particular program is to take place. At block 604, a message is generated, preferably at a time relevant to the recording start time and date, to a multicast ABR video management agent (VMA), operative to facilitate joining of the target recording device to a multicast ABR stream at a select bitrate representation of the particular program for recording, the select bitrate representation being determined responsive to a bandwidth allocation for recording based on the priority level indicated in the program recording request, wherein the select bitrate representation of the particular program is allocated at least a portion of a subscriber premises bandwidth pipe servicing the subscriber premises. In one embodiment, the recording quality, i.e., the bitrate quality, of the particular program may be dynamically adjusted until the recording stop time/date is reached, e.g., based on bandwidth contention conditions on the subscriber premises bandwidth pipe, whereby the priority level indicated in the program recording request may be disregarded for certain time durations as long as there is no bandwidth contention. It should be appreciated that bandwidth contention can be current contention or future contention. For example, if there is no bandwidth contention at a particular time, a higher bandwidth than allowable/allocable based on the priority level may be provided. Likewise, if the bandwidth conditions deteriorate and/or there is contention on the subscriber pipe, the recording quality may drop, e.g., by leaving a higher quality stream and joining a lower quality stream, wherein the bitrate for the lower quality stream may be determined based on the priority level. In other words, recording quality selection may fluctuate in certain embodiments during the course of a recording, responsive to whether the priority level indicator is being applied or not in a bandwidth allocation scheme. These foregoing operations and acts are set forth at block 606. After completing recording of the particular program, a message may be generated to the multicast ABR video management agent for reverting the service channel's priority level to a default setting (block 608).

Figure 6B:
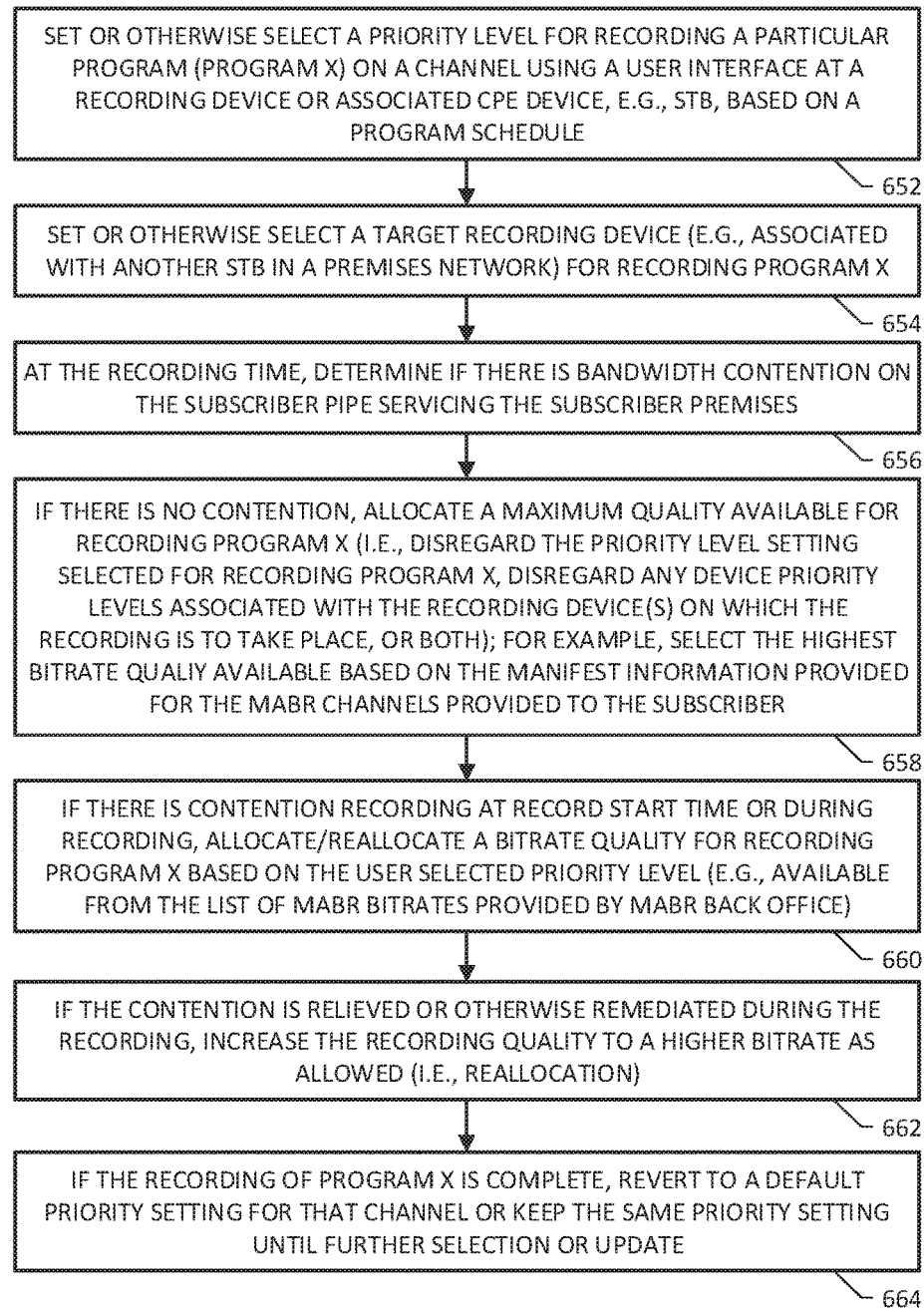
FIG. 6B depicts a flowchart of further acts, steps, functions and/or blocks that may take place in additional or alternative embodiments of the present invention.
Figure 7:
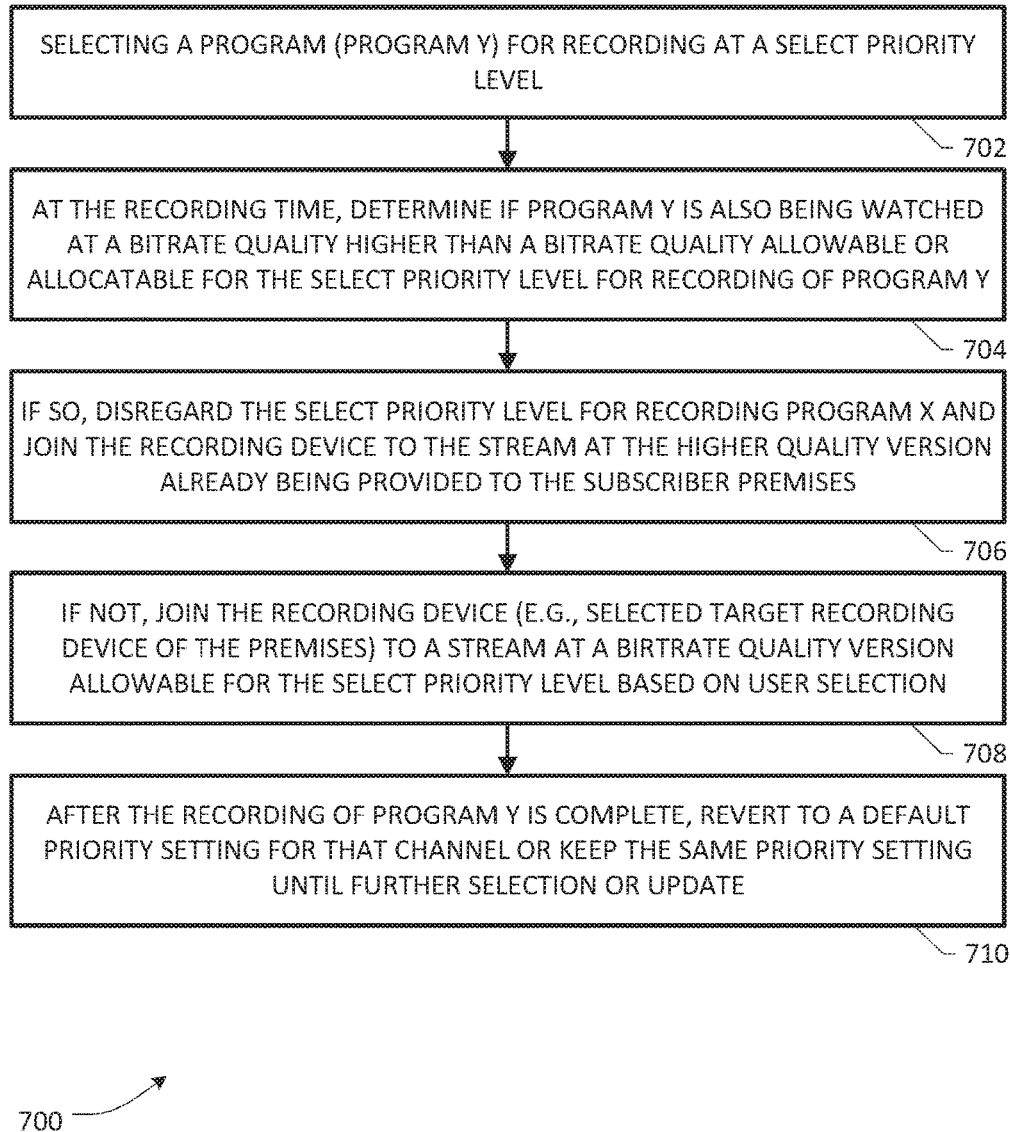
FIG. 7 depicts a flowchart of further acts, steps, functions and/or blocks that may take place in additional or alternative embodiments of the present invention.

FIG. 6B depicts a flowchart 600B of further acts, steps, functions and/or blocks that may take place in additional or alternative embodiments of the present invention. FIG. 7 depicts a flowchart 700 of still further acts, steps, functions and/or blocks that may take place in additional or alternative embodiments of the present invention. One skilled in the art will recognize upon reference hereto that the blocks illustrated in FIGS. 6A, 6B and 7 may be combined in numerous combinations and/or sub-combinations to achieve still further embodiments that may be practiced in accordance with the teachings herein. Turning to FIG. 6B in particular, at block 652, a priority level for recording a particular program (e.g., Program X) on a channel may be set or otherwise selected using a user interface at a recording device or associated CPE device, e.g., STB, based on a program schedule. Optionally, a target recording device (e.g., associated with another STB or a mass storage device in a premises network) may also be selected for recording Program X (block 654). At the recording time, a determination may be made if there is bandwidth contention on the subscriber pipe servicing the subscriber premises (block 656). If there is no contention, a maximum quality available for recording Program X may be allocated (i.e., disregarding the priority level setting selected for recording Program X) and, accordingly, a highest bitrate quality available (e.g., based on the list of all MABR bitrates provided by the MABR back office) may be selected. In a further variation, any device priority levels associated with the recording device(s) on which the recording is to take place may also be disregarded, as exemplified at block 658. On the other hand, if there is contention, a bitrate quality for recording Program X may be selected based on or responsive to the user selected priority level information (e.g., selected from the list of MABR bitrates supplied by the MABR back office). In a further or alternative variation, the list of available bitrates for different MABR service channels may be provided via a purpose-built manifest file. As noted previously, if and when the contention conditions cease to exist (e.g., at any time during the recording), different bitrate(s) may be (re)allocated for recording Program X, as exemplified at blocks 660 and 662. If the recording of Program X is complete, the system may revert to a default priority setting for that channel program or the same priority setting maintained until further selection or update by a user (block 664).

Process flow 700 of FIG. 7 describes another embodiment for recording MABR content in accordance with the teachings herein. At block 702, a program (e.g., Program Y) may be selected for recording at a select priority level. At the recording time, a determination may be made if Program Y is also tuned to for watching (either at the same client device, e.g., an STB whose DVR is also the target recording device, or at some other client device of the premises) at a bitrate quality higher than a bitrate quality allowable or allocatable for the select priority level for recording of Program Y (block 704). If so, the select priority level for recording Program X may be disregarded and the recording device may be joined to the stream at the higher quality version already being provided to the subscriber premises (block 706). Otherwise, the recording device (e.g., selected target recording device of the premises) may be joined to a stream at a bitrate quality version allowable for the select priority level based on user selection (block 708). As before, after the recording of Program Y is complete, the system may revert to a default priority setting for that channel or maintain the same priority setting until further selection or update by a user (block 710).

Figure 8:
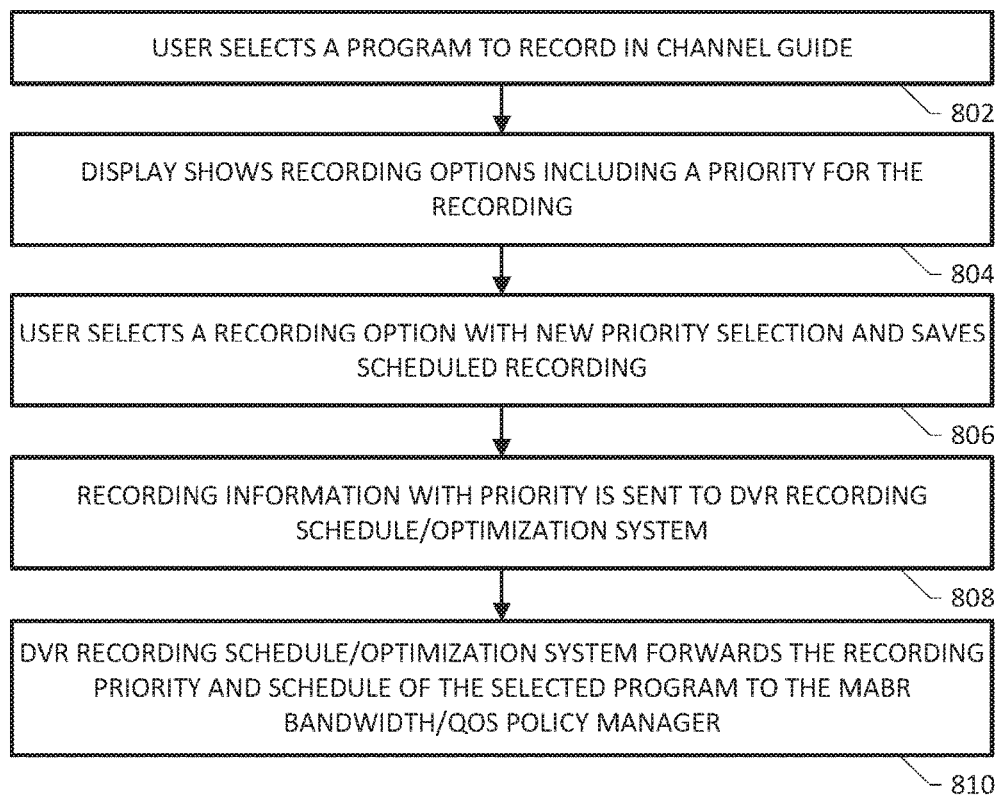
FIG. 8 depicts a flowchart of acts, steps, functions and/or blocks that may take place responsive to a program recording request in one embodiment of the present patent application.

FIG. 8 depicts a flowchart 800 of acts, steps, functions and/or blocks that may take place responsive to program recording request generation in one embodiment of the present patent application. At block 802, a user selects a program to record, e.g., using a channel guide. Response thereto, recording options including a priority selection menu may be displayed at a suitable display device (e.g., TV, laptop monitor, tablet screen, etc.) (block 804). Using the display, the user may input or select a recording option including a priority for recording the program and saves the scheduled recording selection (block 806). Recording information comprising the priority level is sent to and received by a DVR scheduler/optimization subsystem as described hereinabove (block 808). Responsive thereto, the DVR scheduler/optimization subsystem forwards the recording information to an MABR policy manager (block 810).

Figure 9:
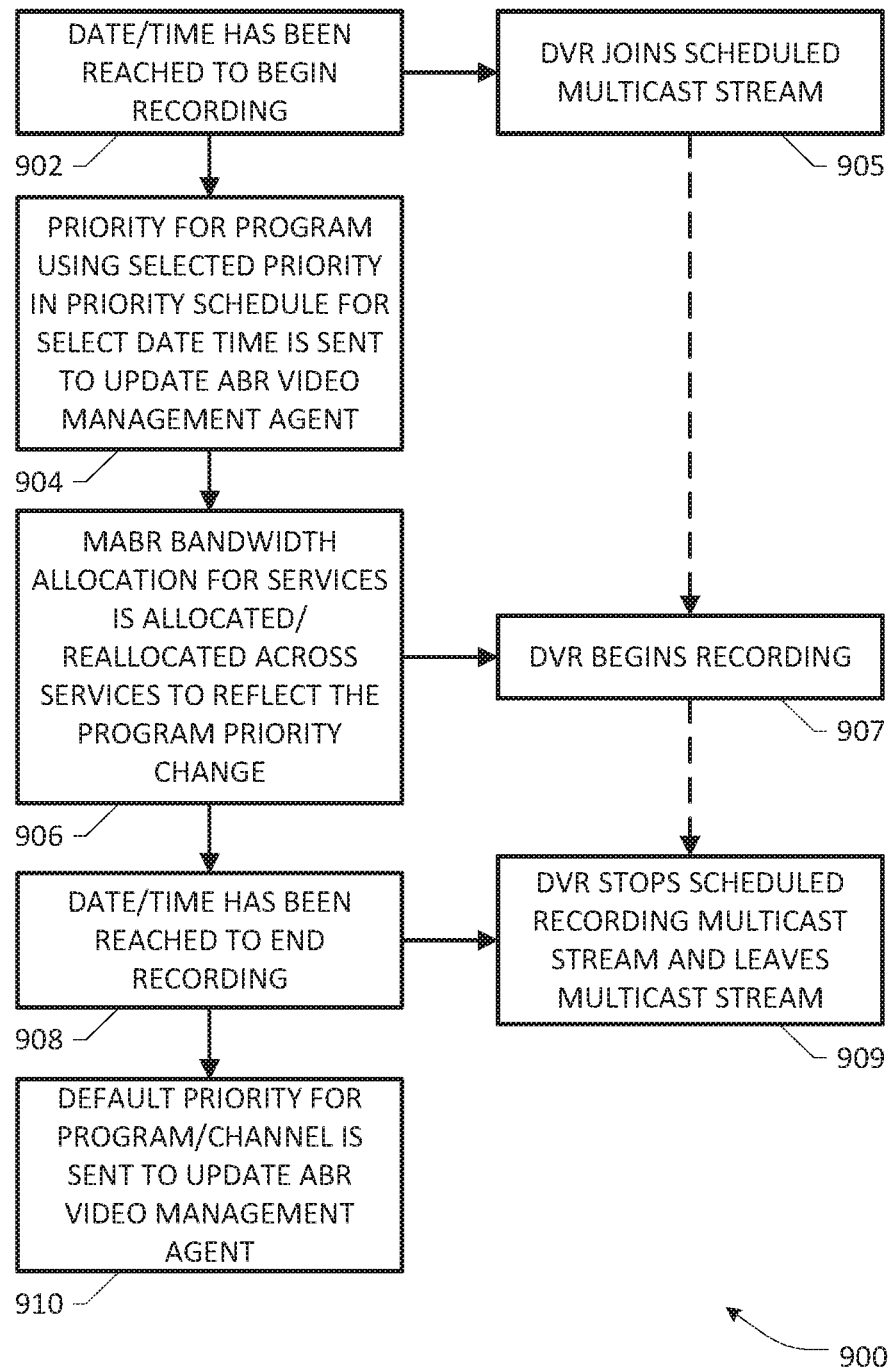
FIG. 9 depicts a flowchart of acts, steps, functions and/or blocks that may take place at a time relative to a recording start time and date indicated in a program recording request according to one embodiment.

Turning to FIG. 9, depicted therein is a flowchart 900 of acts, steps, functions and/or blocks that may take place at a time relative to a recording start time and date indicated in a program recording request according to one embodiment. When the scheduled recording date/time is reached (block 902), the target DVR device proceeds to join the scheduled program channel (block 905). At the network side, priority information for the requested program is sent to and received by the MVMA functionality (block 904), wherein bandwidth allocation for different bitstreams of MABR services is allocated and/or reallocated based suitable channel packing or annealing techniques, which bitstreams are joined at appropriate timing reference points to the corresponding client devices, including the target DVR device (block 906). As set forth at block 907, the target DVR device begins to record the program at a select bitrate representation that is determined and joined based on the bandwidth allocation process. When the scheduled recording end time is reached (block 908), the target DVR stops recording and leaves the multicast service channel stream (block 909). Also, a default priority for the program channel is sent to and received by the MVMA functionality, either at a network agent implementation or at a gateway agent implementation (block 910).

It should be noted that at least some of the bandwidth allocation and/or reallocation operations as well as channel joining operations set forth above may take place using a number of "channel packing" techniques that may involve pipe modeling schemes based on various pieces of parametric information such as composite device priorities (CDP), inadequacy metrics (IM), and the like, potentially/preferably in conjunction with program recording priority levels, device priorities, as well as operator-, subscriber-, and/or content-based policy rules, or in any combination or subcombination thereof. In general, for example, a new channel may be added to the streaming bandwidth pipe based on inadequacy metrics used for selecting which streams are eligible for a bandwidth upgrade during annealing (i.e., iteratively changing bandwidth until no further optimal reallocation can be made). Basically, the inadequacy metric (IM) may be considered as a measure of how far out of balance an allocation to a stream is with regard to its priority and the priority of the other streams in a bandwidth pipe. In one example methodology, given a list of channels and the ABR bandwidths available for each channel, the channels are first sorted by their priority (or other parameters relating to channel weight). A select minimum bandwidth version of the channel is added to the pipe plan. If the channel's minimum bandwidth does not fit (i.e., the pipe is overbooked), then it does not go in the pipe plan and the process moves on to the next channel for further iterations to see how much of an upgrade can be made to the pipe plan. As the channels in the list are sorted by the inadequacy metric, the process can start with the most inadequate channel allocation for attempting to upgrade the bandwidth to the next highest available version of a channel. As pointed above, if the upgrade does not fit within the pipe, that upgrade is skipped and the scheme proceeds to the next most inadequate channel. One skilled in the art should realize that a further variation in optimization may be where channels whose upgrade is impossible, they can be removed from consideration for the rest of the annealing loop. Once a channel is selected for upgrade, the inadequacy metric is recomputed and the scheme restarts the annealing loop, which may be configured to end when no channels can be upgraded to fit into the bandwidth allocation of the bandwidth pipe. Likewise, a CDP-based channel packing may be employed in an annealing process involving MABR and/or UBAR video streams of the streaming video pipe serving a subscriber premises. Additional details with respect to bandwidth divider implementations (e.g., dividing the total streaming video pipe into a MABR portion and a UABR portion), as well as metrics-based stream management may be found in one or more of the following commonly owned U.S. patent application(s): (i) "UNICAST ABR STREAMING" (Ericsson Ref. No.: P43082-US1), application Ser. No. 14/246,920, filed Apr. 2, 2014, in the name(s) of Christopher Phillips et al., and (ii) MERGING MULTICAST ABR AND UNICAST ABR WITH PROGRESSIVE DOWNLOAD ABR IN A CUSTOMER PREMISES DEVICE WITHIN THE SAME VIDEO DELIVERY PIPE" (Ericsson Ref. No.: P43011-US1), application Ser. No. 14/246,880, filed Apr. 2, 2014, in the name(s) of Christopher Phillips et al., which are hereby incorporated by reference.

Figure 10A:
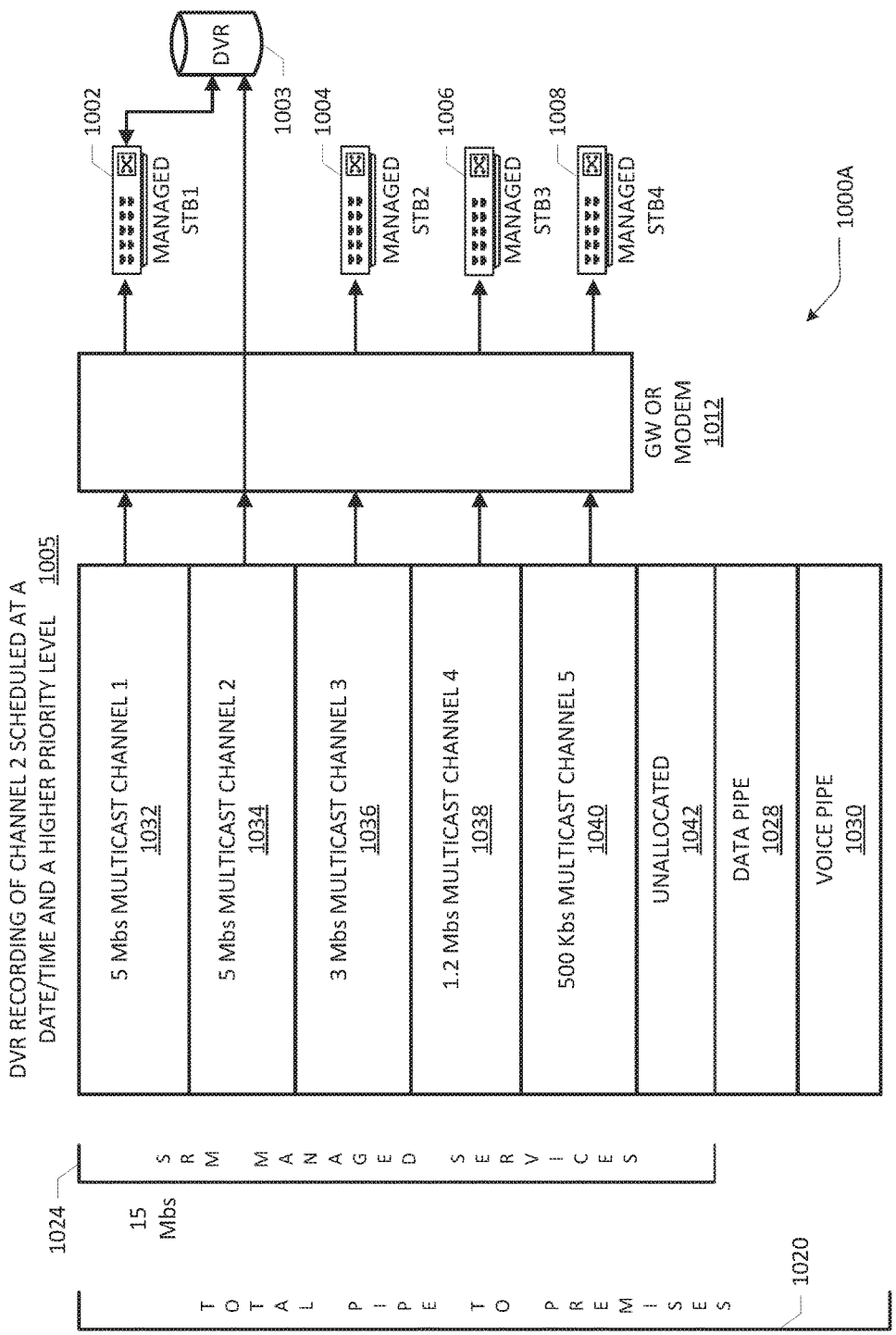
FIG. 10A depicts bandwidth allocation of a managed subscriber bandwidth pipe in one example scenario where a program recording request includes a high priority level for recording a particular program according to an embodiment of the present invention.
Figure 10B:
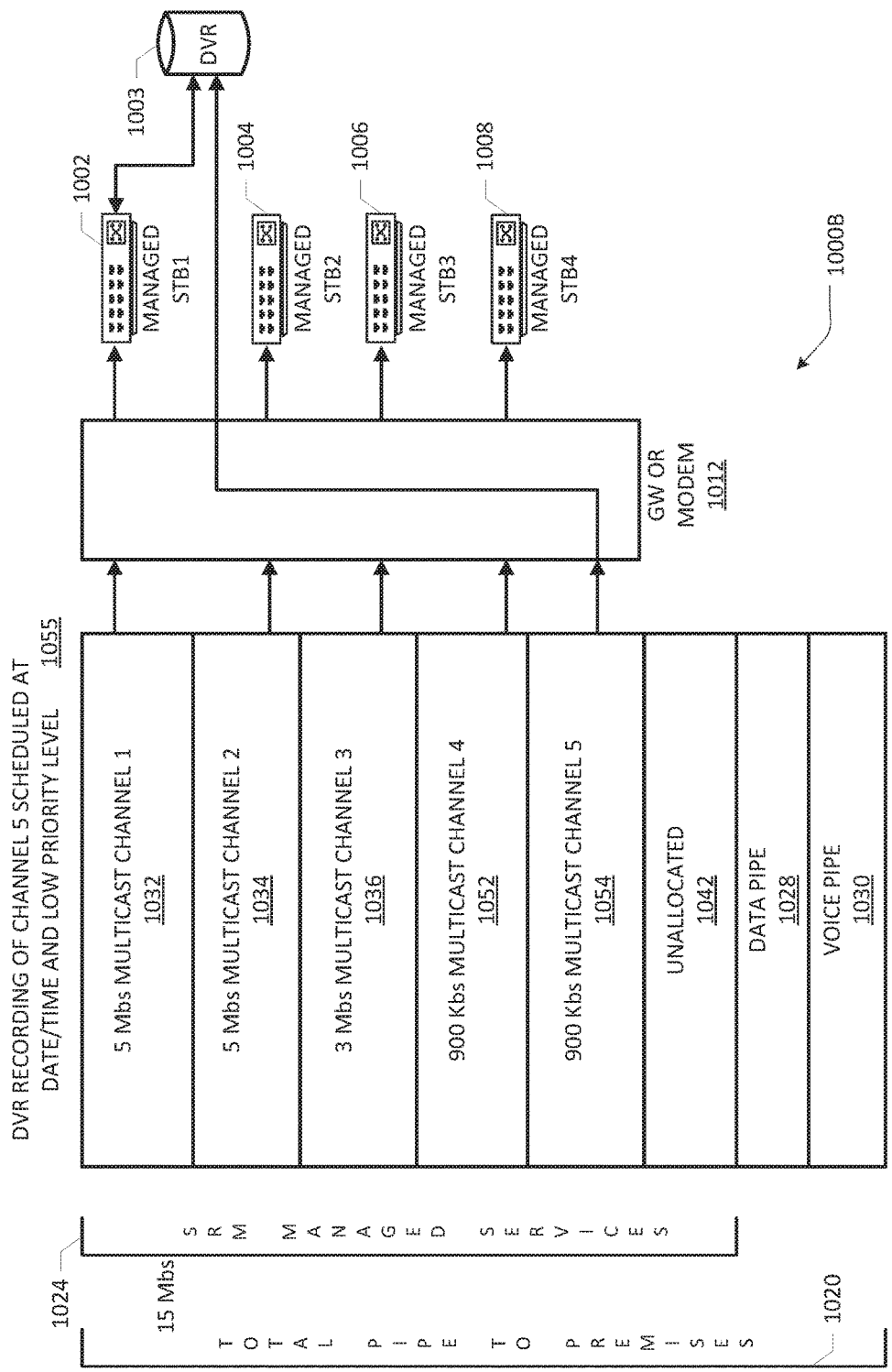
FIG. 10B depicts bandwidth allocation of a managed subscriber bandwidth pipe in one example scenario where a program recording request includes a low priority level for recording a particular program according to an embodiment of the present invention.

Referring to FIGS. 10A and 10B, depicted therein are example bandwidth allocation scenarios with respect to a managed subscriber bandwidth pipe according to an embodiment of the present invention, wherein one example scenario 1000A involves a program recording request that includes a high priority level for recording a particular program on one channel and another example scenario 1000B involves a program recording request that includes a low priority level for recording a particular program on another channel. As illustrated in FIG. 10A, a total bandwidth pipe 1020 to a subscriber premises via premises node 1012 may include a data pipe 1028 and a voice pipe 1030, and may further comprise a managed video streaming pipe 1024 of 15 Mbs that is operative to serve five client devices, e.g., four STBs 1002, 1004, 1006, 1008 as well as a DVR device 1003 coupled to STB 1002, via five multicast channels as managed services provided under a Session Resource Management (SRM). Under a suitable bandwidth allocation scheme, Channel 1 of 5 Mbs 1032 is joined to STB 1002, which has a high priority (P1). In similar fashion, Channel 2 of 5 Mbs 1034 is joined to DVR 1003 associated with STB 1002 because of the high level priority indicated for recording in the program recording request 1005. Channel 3 of 3 Mbs 1036, Channel 4 of 1.2 Mbs 1038 and Channel 5 of 500 Kbs 1040 are respectively joined to STBs 1004, 1006 and 1008, responsive to the bandwidth allocation based on the respective device priorities, leaving an unallocated portion 1042 (e.g., a portion having 300 Kbs).

When a program recording request 1055 that includes a low level priority for recording a different channel (e.g., Channel 5) is issued, a different bandwidth allocation scheme is seen in the scenario 1000B of FIG. 10B. As before, Channel 1 of 5 Mbs 1032 is joined to STB 1002 due it its high priority (P1). As STB 1004 having a high priority is switched to Channel 2, it is also joined at 5 Mbs stream 1034. Likewise, STBs 1006 and 1008 are joined to Channel 3 and Channel 4 having bandwidth allocation pipes of 3 Mbs 1036 and 900 Kbs 1052, respectively. Because of the low priority level for recording the Channel 5 program, a bandwidth allocation of only 900 Kbs is provided for the bitrate stream to which DVR 1003 is joined as illustrated by Channel 5 1054, in spite of the fact that STB 1002 performing the recording at DVR 1003 would normally have a high priority. It should be appreciated that the reduced bandwidth allocation for Channel 5 is based on the lower priority level indicative of a lower quality selected by the user for recording that particular program. The unallocated portion 1042 may also be readjusted in this scheme (e.g., changed to 200 Kbs instead of 300 Kbs).

Figure 11:
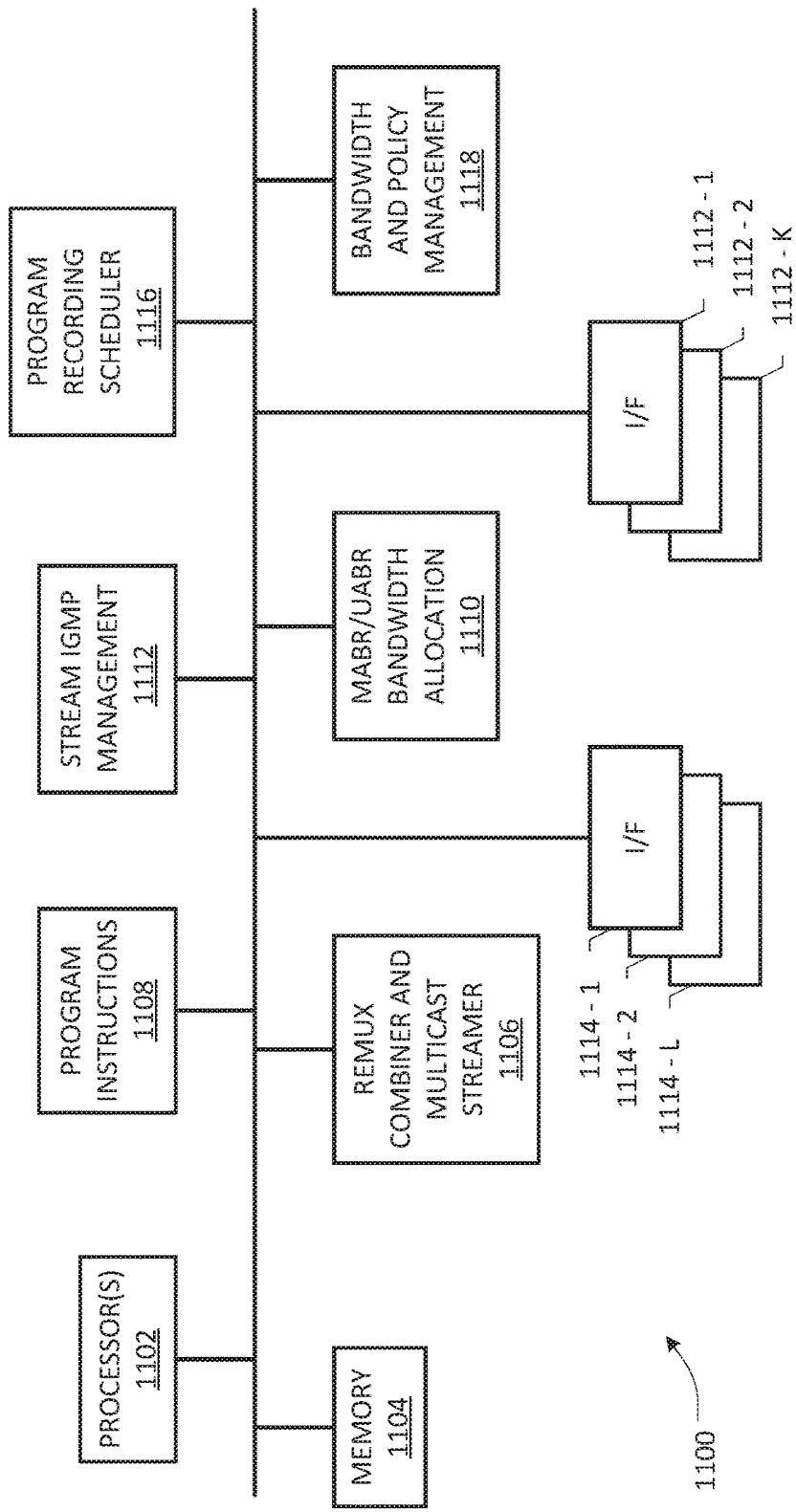
FIG. 11 depicts a block diagram of an example apparatus operative as a network node, element, or subsystem in an MABR communications network of FIG. 1A or FIG. 1B according to an embodiment of the present patent application.

FIG. 11 depicts a block diagram of an apparatus 1100 that may be selectively configured as a network node or subsystem operative in an MABR communications network of FIG. 1A or FIG. 1B according to an embodiment of the present patent application. For example, apparatus 1100 may be configured as MVMA functionality in a network agent or gateway agent implementation. One or more processors 1102 may be operatively coupled to various modules that may be implemented in persistent memory for executing suitable program instructions or code portions with respect to one or more processes set forth hereinabove for facilitating channel re-muxing, channel joining/leaving, de-gapping, and/or bandwidth allocations, etc., depending on a particular configuration. A stream IGMP management module 1112 is operative to perform various processes for generating appropriate signals to an IGMP switch or a premises gateway node for joining the requested channels in accordance with the teachings set forth hereinabove. A remux combiner and multicast streamer 1106 is operative to de-gap and stitch the multicast channel streams for injecting into downstream communication paths at configured multicast addresses. A MABR bandwidth allocation module 1110 is operative to apply suitable bandwidth allocation policies to a subscriber premises pipe as necessary under suitable program instructions, e.g., program instructions 1108 and/or other code portions in memory 1104, or in conjunction with a bandwidth policy manager 1118 to effectuate stream selection and channel packing. A suitable segment cache (not specifically shown) may also be provided as part of the memory system of the apparatus 1100. Further, the arrangement shown in FIG. 11 may be (re)configured as a DVR recording scheduler/optimization node in certain embodiments, suitably modified as needed, by including a program scheduler functionality (e.g., scheduler 1016) and deleting the non-required modules. In a still further arrangement, apparatus 1100 may also be (re)configured as a MABR bandwidth/QoS policy manager node having a suitable database such as database 406 (shown in FIGS. 4A and 4B). Depending on the configuration, various network interfaces (I/F) 1114-1 to 1114-L may be appropriately provided with respect to effectuating communications with MABR bandwidth/QoS policy manager nodes, DVR recording/scheduler nodes, back office nodes, SAG units and/or MSF functionalities, Session Resource Management (SRM) nodes, IGMP switches, unicast switches, and the like. In similar fashion, interfaces 1112-1 to 1112-K are operative to effectuate communications with a plurality of STBs and other client devices (in a gateway agent implementation, for example) via a suitable premises network as set forth in FIG. 1B.

Figure 12:
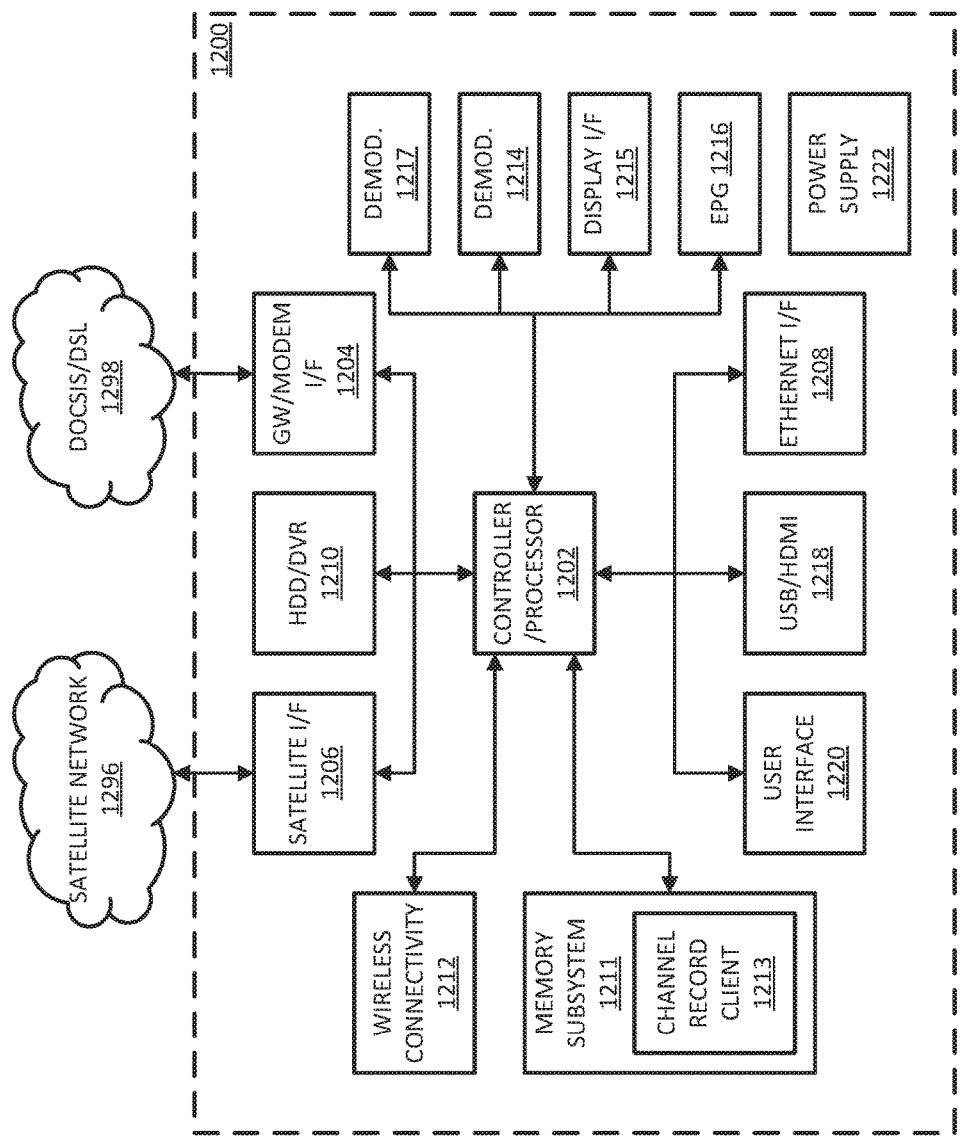
FIG. 12 depicts a block diagram of an example subscriber station (e.g., STB) according to an embodiment of the present patent application.

FIG. 12 depicts a block diagram of an example subscriber station (e.g., STB) 1200 according to an embodiment of the present patent application. STB 1200 is generally representative of a client device or subscriber station forming one of the plurality of devices 104-1 to 104-N shown in FIG. 1A or 1B, and may include appropriate hardware/software components and subsystems configured for performing any of the device-side processes (either individually or in any combination thereof) with respect to generating program recording requests and receiving appropriate responses described hereinabove. One or more microcontrollers/processors 1202 are provided for the overall control of the subscriber device 1200 and for the execution of various stored program instructions embodied in a persistent memory 1213 for operation as a multicast client including recording capability that may be part of a memory subsystem 1211 of the subscriber device 1200. Controller/processor complex referred to by reference numeral 1202 may also be representative of other specialty processing modules such as graphic processors, video processors, digital signal processors (DSPs), and the like, operating in association with suitable video and audio interfaces (not specifically shown). Appropriate interfaces such as I/F modules 1204 and 1206 involving or operating with tuners, demodulators, descramblers, MPEG/H.264/H.265 decoders/demuxes may be included for processing and interfacing with multicast IPTV and other content signals received via a DSL/CMTS network 1298 or a satellite network 1296. Example demodulators including NTSC demodulator 1214 and ATSC/PAL demodulator 1217, etc., may also be provided. Other I/O or interfaces such as a display interface 1215, EPG 1216 for identifying service channels, user interface or remote control interface 1220, USB/HDMI ports 1218, Ethernet I/F 1208, and short-range and wide area wireless connectivity interfaces 1212 are also provided. A hard disk drive (HDD) or DVR system 1210 may be included for mass storage of all sorts of program assets such as multicast content e.g., A/V media, TV shows, movie titles, multimedia games, etc. Also included in STB 1200 is a suitable power supply block 1222, which may include AC/DC power conversion to provide power for the device 1200. It should be appreciated that the actual power architecture for the subscriber device 1200 may vary by the hardware platform used, e.g., depending upon the core SoC (System on Chip), memory, analog front-end, analog signal chain components and interfaces used in the specific platform, and the like.

One skilled in the art will further recognize that various apparatuses, subsystems, functionalities/applications and/or one or more network elements as well as the underlying network infrastructures set forth above for facilitating recording of MABR content may be architected in a virtualized environment according to a network function virtualization (NFV) architecture in additional or alternative embodiments of the present patent disclosure. For instance, various physical resources, databases, services, applications and functions executing within an example network, e.g., network architectures or network portions shown in drawing Figures herein may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of software, e.g., with respect to DVR recording scheduler/optimization, MABR back office and bandwidth/QoS policy management, MVMA functionality, IGMP functionality, etc., as well as platforms and infrastructure of an ABR network may be implemented in a service-oriented architecture, e.g., Software as a Service (SaaS), Platform as a Service (PaaS), infrastructure as a Service (IaaS), and the like, with multiple entities providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Based upon the foregoing Detailed Description, it should be appreciated that one or more embodiments of the present disclosure can be advantageously implemented in a number of multicast environments to facilitate prioritization of recordings, both against other recordings and against real-time video consumption. Prioritization of programming content is especially useful, as one consumer might not care if real-time videos are reduced in quality if it means their recorded content is of a higher quality. Whereas the opposite might be true for other consumers with respect to their respective video experiences. Furthermore, one or more embodiments may be practiced in conjunction with typical streaming technologies such as HLS, HDS, HSS, DASH, and the like.

In the above-description of various embodiments of the present disclosure, it is to be understood that the terminology used herein is for the purpose of describing particular embodiments only and is not intended to be limiting of the invention. Also, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An apparatus for facilitating recording of content in a multicast adaptive bitrate (MABR) communications network, the apparatus comprising:
a segmentation and gapping (SAG) unit configured to receive a plurality of encoded MABR streams for each service channel from an MABR encoder operative to receive a plurality of service channels, wherein each encoded MABR stream corresponds to a particular bitrate representation of a specific service channel, the SAG unit further operative to generate a segmented and gapped MABR stream for each encoded MABR stream of each service channel;
a digital video recorder (DVR) scheduler element configured to provide program recording schedules to a client device disposed in a subscriber premises including one or more client devices, the program recording schedules comprising an electronic program guide showing a plurality of programs available on a set of MABR service channels serving the subscriber premises, the DVR scheduler element further configured to receive a program recording request from the client device including a selection to record a particular program on a service channel, the program recording request further including a recording start time and date, a recording stop time and date, a priority level indicative of a video quality preference for recording the particular program and an indication of a target recording device of the subscriber premises on which recording of the particular program is to take place; and
a multicast ABR bandwidth policy manager operably coupled to the DVR scheduler element and configured to generate, at a time relevant to the recording start time and date, a message to a multicast ABR video management agent (MVMA), operative to facilitate joining of the target recording device to a multicast ABR stream at a select bitrate representation of the particular program for recording, the select bitrate representation being determined responsive to a bandwidth allocation for recording based on the priority level indicated in the program recording request, wherein the select bitrate representation of the particular program is allocated at least a portion of a subscriber premises bandwidth pipe servicing the subscriber premises, wherein the multicast ABR video management agent is configured to operate at a network node upstream from an Internet Group Management Protocol (IGMP) router of the MABR communications network.

2. The apparatus as recited in claim 1, wherein the multicast ABR video management agent is configured as a virtual machine operating on a platform disposed upstream from an Internet Group Management Protocol (IGMP) router of the MABR communications network.

3. The apparatus as recited in claim 1, wherein the multicast ABR video management agent is configured to operate at a premises node associated with the subscriber premises, the premises node comprising one of a Digital Subscriber Line (DSL) gateway and a Data Over Cable Service Interface Specification (DOCSIS)-compliant cable modem.

4. The apparatus as recited in claim 1, wherein the multicast ABR video management agent is further configured to:
receive a gapped MABR stream of the select bitrate representation of the particular program from the SAG unit and at a suitable time code reference point join the gapped MABR stream of the select bitrate representation; and
de-gap the joined gapped MABR stream of the select bitrate representation for transmission to the target recording device.

5. The apparatus as recited in claim 1, wherein the multicast ABR video management agent comprises a virtual pipe bandwidth manager configured to:
responsive to determining that there is no bandwidth contention on the subscriber premises pipe, disregard the bitrate quality indicated responsive to the priority level of the program recording request;
allocate a bandwidth for recording the particular program at a maximum bitrate quality; and
join a multicast ABR stream at a highest bitrate representation of the particular program corresponding to the maximum bitrate quality for recording at the target recording device.

6. The apparatus as recited in claim 1, wherein the multicast ABR video management agent comprises a virtual pipe bandwidth manager configured to:
dynamically adjust a recording quality of the particular program until the recording stop time and date based on bandwidth contention conditions on the subscriber premises bandwidth pipe and disregard the priority level indicated in the program recording request as long as there is no bandwidth contention; and
join different multicast ABR streams at optimum bitrate representations of the particular program at different times during recording based on dynamical adjustment of the recording quality.

7. The apparatus as recited in claim 1, wherein the MABR encoder is operative to receive channel source feeds of media content encoded using one of a Moving Pictures Expert Group (MPEG) codec, an MPEG-2 codec, an MEPG-4 codec, an H.264 codec, and an H.265 codec.

8. The apparatus as recited in claim 1, wherein the multicast ABR bandwidth policy manager is operative to generate a message to the multicast ABR video management agent for reverting the service channel's priority level to a default setting upon completion of recording of the particular program.

9. The apparatus as recited in claim 1, wherein the client device comprises a set-top-box (STB) and the target recording device is integrated with the STB from which the program recording request is generated.

10. The apparatus as recited in claim 1, wherein the target recording device is a media storage device provided as part of a premises network comprising the plurality of client devices disposed in the subscriber premises.

* * * * *